(12) United States Patent
Seidenberg et al.

(10) Patent No.: US 7,194,492 B2
(45) Date of Patent: Mar. 20, 2007

(54) METHOD AND APPARATUS FOR EFFICIENTLY COPYING DISTRIBUTED DATA FILES

(75) Inventors: Thomas Seidenberg, Lancaster, MA (US); Raju C. Bopardikar, Carlisle, MA (US)

(73) Assignee: EMC Corporation, Hopkinton, MA (US)

( * ) Notice: Subject to any disclaimer, the term of this patent is extended or adjusted under 35 U.S.C. 154(b) by 393 days.

(21) Appl. No.: 10/452,688

(22) Filed: Jun. 2, 2003

(65) Prior Publication Data

US 2004/0098424 A1 May 20, 2004

Related U.S. Application Data

(63) Continuation of application No. 10/283,022, filed on Oct. 29, 2002, now abandoned.

(60) Provisional application No. 60/343,702, filed on Oct. 29, 2001.

(51) Int. Cl.
*G06F 12/00* (2006.01)
*G06F 17/30* (2006.01)

(52) U.S. Cl. .................. 707/204; 707/200; 707/202; 707/203; 707/205

(58) Field of Classification Search ............... 707/200, 707/203, 204, 202, 205
See application file for complete search history.

(56) References Cited

U.S. PATENT DOCUMENTS 6,205,450 B1 * 3/2001 Kanome .................. 707/203

OTHER PUBLICATIONS

Whitaker et al., Digital Technical Journal, vol. 8, No. 2, pp. 15-31, 1996.*

* cited by examiner

*Primary Examiner*—Tim Vo
*Assistant Examiner*—Cheyne Ly
(74) *Attorney, Agent, or Firm*—Law Offices of Paul E. Kudirka

(57) ABSTRACT

Metadata that relates logical block addresses of data used by a file system with the physical block addresses at which the data is stored is maintained in nodes that are arranged into a hierarchical volume map tree that extends from a root node to a plurality of leaf nodes. A copy of the volume map tree root node is maintained in a data structure called a delta that represents the data in the covolume and the modifications to that volume map tree copy represent all additions, changes or deletions made to the volume. A copy of the data, or a new covolume, can be made by creating a new delta containing a new copy of the volume map tree root node as it existed at the time the new covolume was created. The deltas are arranged into a tree structure that represents the data in a covolume and whether the data is unchanged from a previous covolume or changed in that covolume. The delta tree structure can be used to determine whether a delta is not shared so that its covolume can be deleted. Deltas may also be arranged in local delta trees that represent changes to a particular logical is location. The local delta tree can be used to quickly locate unused locations in order to free these locations.

28 Claims, 38 Drawing Sheets

LDT3

LDT2

METHOD AND APPARATUS FOR EFFICIENTLY COPYING DISTRIBUTED DATA FILES

RELATED APPLICATIONS

This application is a continuation of U.S. application Ser. No. 10/283,022 now abandoned which is a non-provisional of provisional application Ser. No. 60/343,702, filed on Oct. 29, 2001 by Thomas Seidenberg and Raju C. Bopardikar.

FIELD OF THE INVENTION

This invention relates to methods and apparatus for quickly copying data for backup, mirroring, parallel development, test environments, or other uses requiring two or more copies of the same data that may then be accessed or modified independently.

BACKGROUND OF THE INVENTION

In data processing applications involving the transfer, manipulation, storage, and retrieval of large amounts of data, there is often a need for an operation that creates a copy of all of the data. For example, a copy may be performed in order to capture the data at a given instant in time for a backup.

In the case where the amount of data is large, a simple copy of all the data may be very time consuming. Consequently, many copy operations create two copies such that the copies share data that has not changed since the time the copy was made. In many cases, it is desirable that the mechanism that creates the copy has the following properties: atomicity, small creation time, the ability to create both read-only and read-write copies, and maximal data sharing.

SUMMARY OF THE INVENTION

In accordance with the principles of the invention, metadata that relates logical block addresses of data used by a file system with the physical block addresses at which the data is stored is maintained in nodes that are arranged into a hierarchical volume map tree that extends from a root node to a plurality of leaf nodes. The volume map tree represents the location of data in a covolume and is modified dynamically as data is written into logical block and physical block pairs in the volume.

A copy of the volume map tree root node is maintained in a data structure called a delta that represents the data in the covolume and the modifications to that volume map tree copy represent all additions, changes or deletions made to the volume. According to the principles of the invention, a copy of the data, or a new covolume, can be made by creating a new delta containing a new copy of the volume map tree root node as it existed at the time the new covolume was created. Thus, copies can be made almost instantaneously. When it is made, the new volume map tree shares all nodes with the original covolume map tree, thereby insuring maximal sharing. However, as changes are made, the volume map tree copy, including the root node is modified so that a new tree is formed with some nodes remaining shared with the original tree and some new nodes are created. These shared and new nodes represent data from the original covolume that remains unchanged and data in the new covolume that has been changed, respectively.

Because the volume map tree in a delta represents some shared and some new data, when a covolume is deleted it is not possible to simply delete all nodes from its volume tree map because that would delete data from earlier covolumes. Accordingly, the deltas are arranged into a tree structure that represents the data in a covolume and indicates whether the data is unchanged from a previous covolume or changed in that covolume. The delta tree structure can be used to quickly determine which covolumes to search when looking for data and to determine whether a delta is not shared so that its covolume can be deleted.

In another embodiment, deltas may also be arranged in local delta trees that represent changes to a particular logical location. The local delta tree provides a mechanism to implement an ordered search of the deltas to produce a set of deltas that changed the location. It can be used to quickly locate unused locations in order to free these locations.

BRIEF DESCRIPTION OF THE DRAWINGS

The above and further advantages of the invention may be better understood by referring to the following description in conjunction with the accompanying drawings in which.

DETAILED DESCRIPTION

The description of the inventive copy process in the following discussion will be in terms of data entities called "volumes." However, the inventive copy process applies equally well to other data entities, such as databases, files, or records. The discussion of volumes should not be considered a limitation of the invention. In this discussion, the term "covolume" refers to one particular copy, or version, of a volume, among many related copies. The term "supervolume" refers to a collection of one or more related covolumes.

Figure 1:
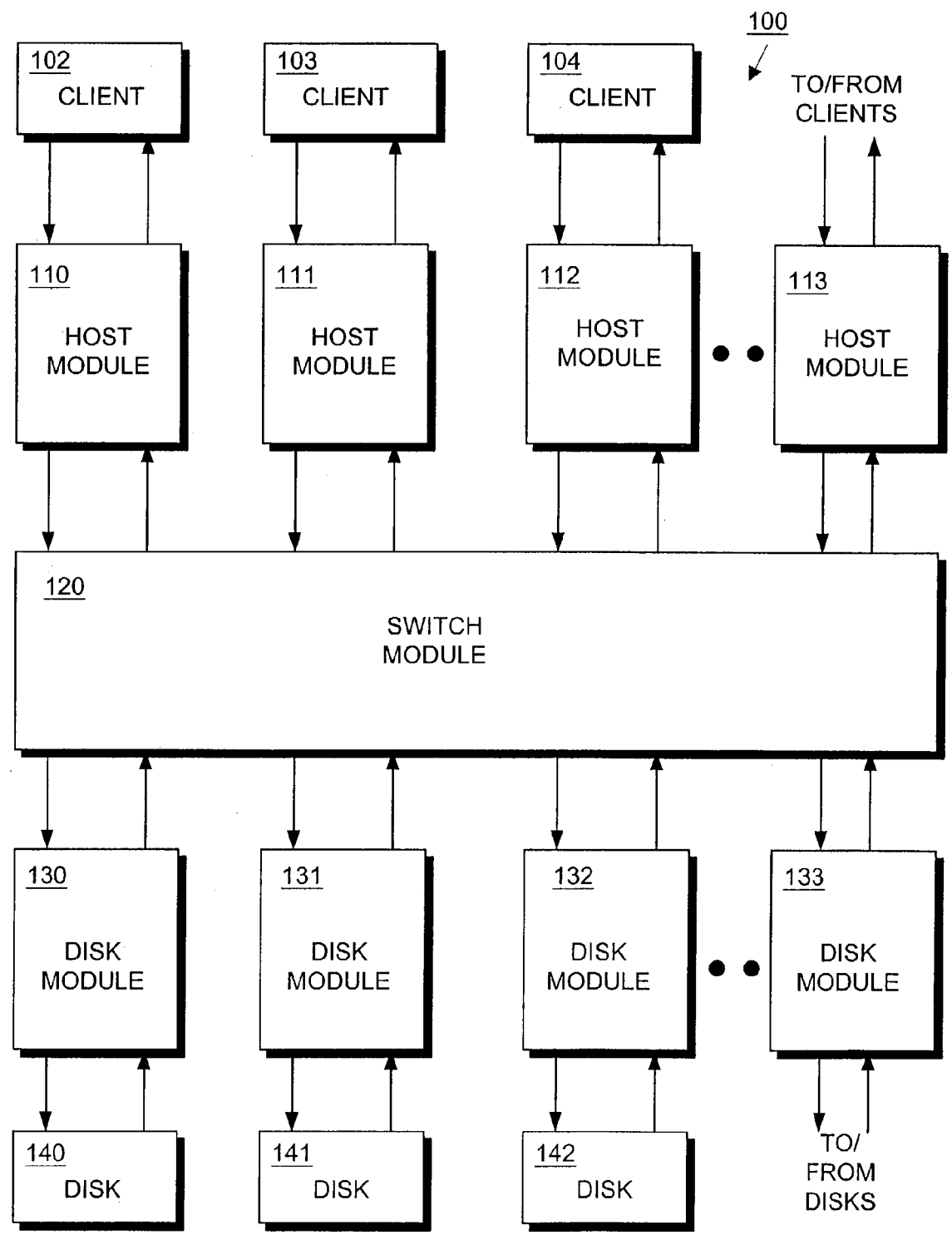
FIG. 1 is a block schematic diagram of a prior art Internet-based storage system in which the inventive copy system can run.

FIG. 1 shows a block schematic diagram of a storage system on which the inventive copy process can be run on volumes. The storage system of FIG. 1 is discussed as an example only and is not to be considered a limitation of the invention. Although the description below may refer to terms commonly used in describing particular computer and storage systems, the described concepts apply equally to other computer and storage systems, including systems having architectures that are dissimilar to that shown in FIG. 1. The storage system 100 consists of a set of host modules 110–113, disk modules 130–133, and switch modules 120.

The host modules 110–113 provide one or more clients, of which clients 102–104 are shown, access to the system 100. The host modules 110–113 and clients 102–104 communicate using a message passing protocol that is compatible with the client. The host modules 110–113 parse requests from the clients 102–104 for volume accesses and are responsible for the logical allocation of the storage resources. The host modules are responsible for mapping the client's volume logical block addresses to the physical block addresses used by the disk modules.

The disk modules 130–133 each support a plurality of disks and are responsible for the physical allocation of their disk resources. The disk interface modules provide data buffering, parity generation and checking, and respond to requests from the host interface modules for access to their associated disks. The disk modules are responsible for mapping the physical disk addresses to particular disks 140–142 and to storage blocks within those disks.

The switch module 120 provides the command and data paths used to interconnect the host modules 110–113 and disk modules 130–133. The switch module contains control and data switches for this purpose.

During the operation of the storage system, a host module receives a request from a client. The request always contains a volume "handle" that has been assigned by the storage system to each volume, and the logical block address of the data block to be accessed. In order to keep multiple copies of data, after reading data at a particular logical location and modifying that data, a client file system writes the modified data back with the same logical block address, but to a physical block location that is different from the physical block location from which the data was read. Thus, the logical block address/physical block address pair that was used to read data is different from the logical block address/physical block address pair used to write the data back to storage. This prevents the modified data from overwriting the original data.

The software that maintains a mapping between client-specified logical block addresses, volume identifiers, and the physical block addresses that specify the location of the data in the disks 140–142 is called a logical storage manager (LSM). In one embodiment, the LSM is the entity that implements the inventive copy process.

Figure 2:
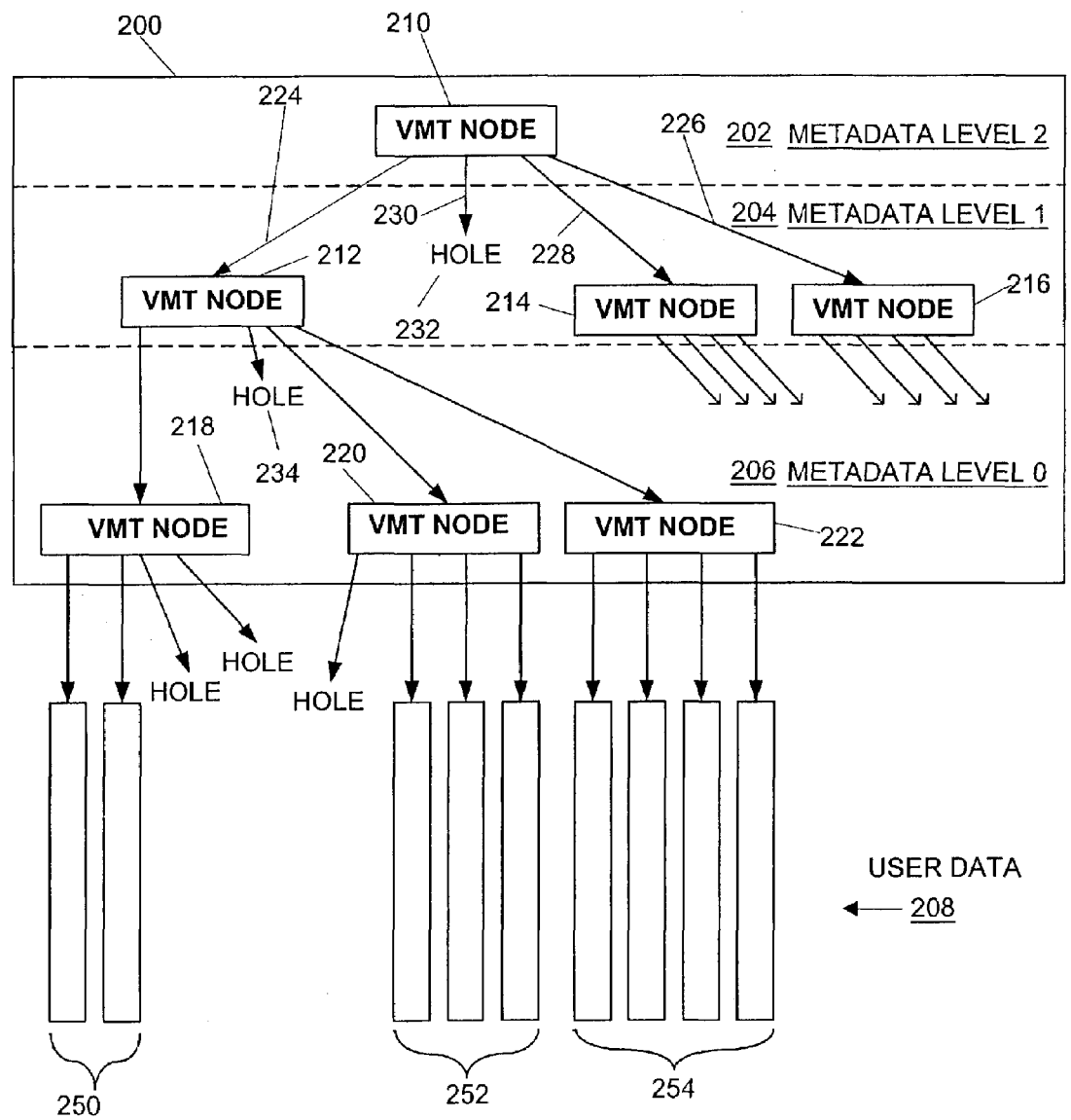
FIG. 2 is a schematic diagram showing a portion of an illustrative volume map tree.

To map logical block addresses (LBAs) to physical block addresses, each host module of modules 110–113 uses an N-ary tree structure called a "volume map tree" (VMT). Part of an illustrative VMT 200 is shown in FIG. 2. VMT 200 consists of a plurality of nodes 210–222 that are arranged in parent-child relationships as indicated by arrows, such as arrows 224–230. One or more of the children of any node, such as node 210, in the VMT 200 may be a "hole", such as hole 232. A hole is a range of one or more logical block addresses to which information has never been written. Holes are indicated by the "null" addresses, which is an address that is not otherwise valid.

All VMTs, such as VMT 200 have three important characteristics. First, VMT 200 is balanced in that all branches have the same height. This is indicated in FIG. 2 in which the children of a node are always located on the level immediately below the level on which that node is located. For example, the children of node 210 that is located on level 202 are always on the next level 204. In addition, the leaves are all on the same level.

Next, a VMT also has a constant branching factor in that all nodes have the same number of children. For example, in FIG. 2, node 210 has four child nodes, including nodes 212, 214 and 216 and hole 232. Similarly, node 212 has nodes 218, 220 and 222 and hole 234 as children. Nodes 214 and 216 also have four children each in level 206, but these latter children are not shown in FIG. 2. Finally, VMT nodes are direct indexed in that the children of a node all represent equally sized ranges of LBAs.

The data in a VMT is considered "metadata" that describes the location of user data in which the client is interested. VMT 200 in FIG. 2 has three levels 202, 204 and 206 of metadata blocks. FIG. 2 also shows a fourth level 208 of user data blocks 250, 252 and 254 that are not part of the VMT 200. Metadata blocks 210–222 and user-data blocks 250–254 are hereafter referred to collectively as "blocks" and the storage system allocates storage for both the metadata and the user data blocks.

The "logical location" of a block is a logical address that defines where the block is located in the VMT. The logical location of a VMT node is defined by the first LBA the node can map, and the level of the node in the VMT. In turn, the level of a node is distance of the node from the leaf nodes that are at the lowest level of the tree 200. Therefore, VMT-leaf nodes 218, 220 and 222 are all at level 0 (206); the VMT-parent nodes 212, 214 and 216 of the VMT-leaf nodes 218, 220 and 222 are all at level 1 (204). In FIG. 2, the root node 210 is at node level 2. When a VMT, such as VMT 200 is initially created, it consists of a single root node 210. This root node has a level determined by the number of levels needed to represent a volume with a size that is specified at creation time. During each write operation, additional nodes in additional levels are added dynamically as data is written to corresponding LBA and physical block address pairs. Thus, the tree grows from the root to the leaves that are always at level zero. This process is described in connection with FIG. 25 below.

The VMT 200 and its associated user-data 250, 252 and 254 to which it refers together are called a "delta" and a delta is said to contain the data to which it refers. When a supervolume is created, a single covolume and a single delta are created. All changes to this covolume are then reflected in this delta. When another covolume is created, another delta is created and this delta becomes active. All changes then made to this new covolume are reflected in this new delta. The original delta is not changed thereafter and is considered inactive.

Although FIG. 2 shows the VMT with a single root 210, the VMT may have multiple roots that are not shown in FIG. 2. Each time a covolume is created, the root node in the source covolume delta is copied and used as the root node of the VMT in the new delta. Since this root node contains the branches that were introduced by the source covolume, the new covolume shares all VMT nodes with the source covolume. As the new covolume introduces changes, its VMT differs from the VMT of the source covolume. Thus, the VMT of a delta records the differences between that delta and another delta, or the differences between that delta and a notational delta that contains nothing. It should be noted that most deltas do not contain the complete image of a covolume because the VMT it contains only reflects changes due to write operations made when the delta was active. Those nodes where no write operations have been performed remain shared with the source covolume and the data contained in it. Consequently, each delta typically contains only a portion of the covolume image. When taken individually, deltas provide neither a complete nor a consistent image of the covolume. Only when the delta is combined with other deltas does the complete and consistent image of the covolume appear.

Figure 3:
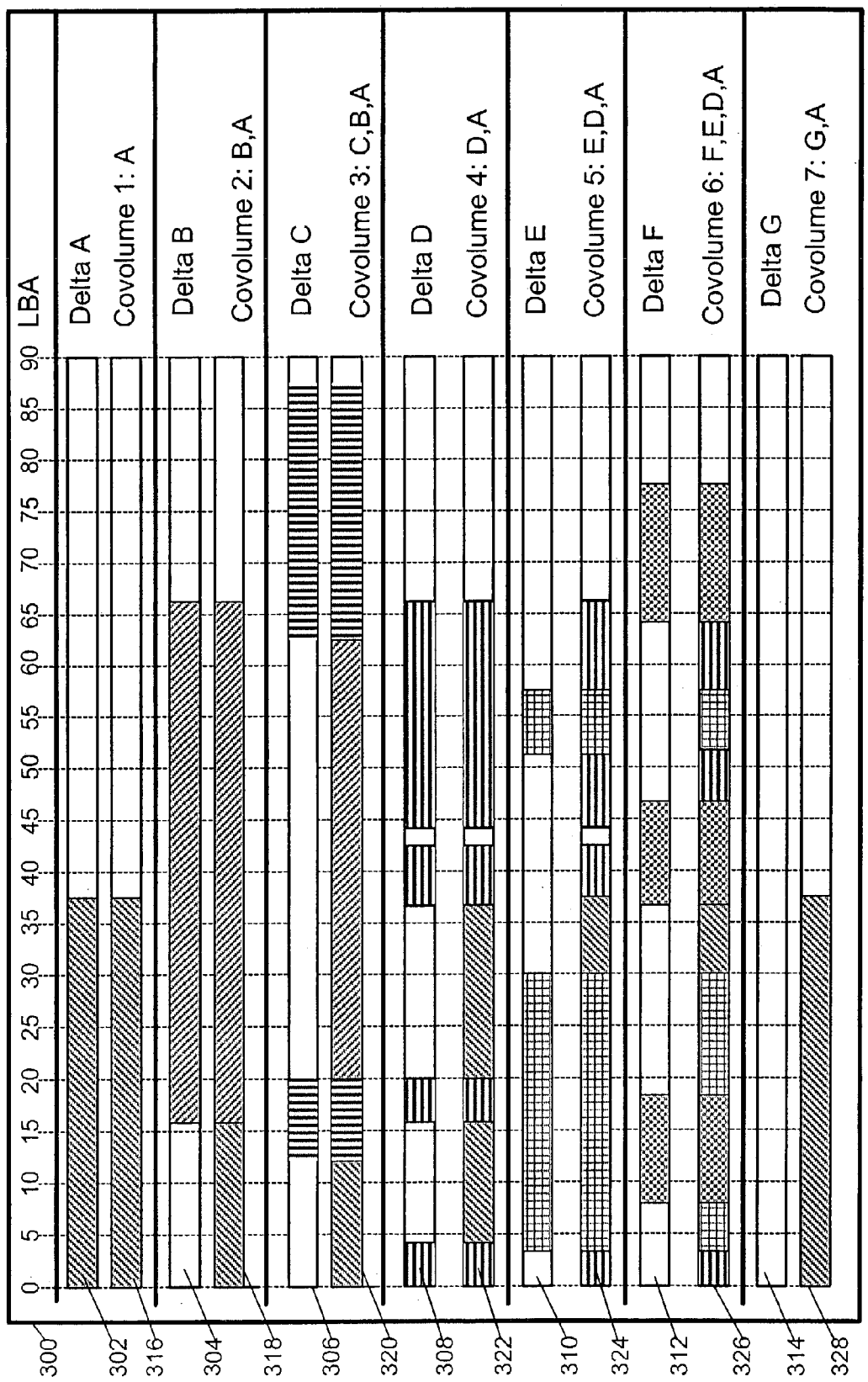
FIG. 3 is a schematic diagram showing illustrative deltas and covolumes.

FIG. 3 shows graphically how deltas are combined to create the image of a covolume. In particular, FIG. 3 shows the image of seven deltas 302–314, labeled deltas A–G, and seven covolumes 316–328, labeled covolumes 1–7, as horizontal boxes, where hatched sections represent changes, or data, and blank sections represent holes, or no data. The horizontal axis of the figure represents LBAs 0 to 90. Each covolume is further described by a list of deltas that composes its complete image. The deltas in the list appear in search order. Specifically, the first delta that will be located in a search is the first delta in the list.

As illustrated in FIG. 3, the complete image of covolume 1 (316) is composed solely of delta A (302.) This means that, at any LBA, covolume 1 (316) contains whatever delta A 302 contains. If delta A (302) contains nothing for the given LBA then covolume 1 (316) contains nothing for that LBA. However, the complete image of other covolumes may be more complicated. For example, the image of covolume 6 (326) comprises several deltas. For any given LBA, covolume 6 (326) first attempts to access data in delta F (312.) If there is no data in delta F (312) for the given LBA, covolume 6 (326) then attempts to access the data in delta E (310.) If there is no data in delta E (310) for the given LBA, covolume 6 (326) then attempts to access the data in delta D (308.) If there is no data in delta D (308) for the given LBA, covolume 6 (326) attempts to access the data in delta A (302.) Finally, if delta A (302) contains nothing for the given LBA, then covolume 6 contains nothing for the given LBA.

When one delta does not contain data for a particular LBA, but another delta does contain data for that LBA, the former delta is said to "share" the data in the latter delta. Sharing occurs when the latter delta is normally searched after the former delta when looking for data. For example, delta B (304) shares the data in LBAs 0 through 15 from delta A. In contrast to sharing, a delta is said "own" the data that composes it. Thus, delta B (304) owns the data in LBAs 16 through 65. A delta may share data from multiple other deltas. For example, delta F 312 shares data from deltas E (310), D (308), and A (302.)

Figure 4:
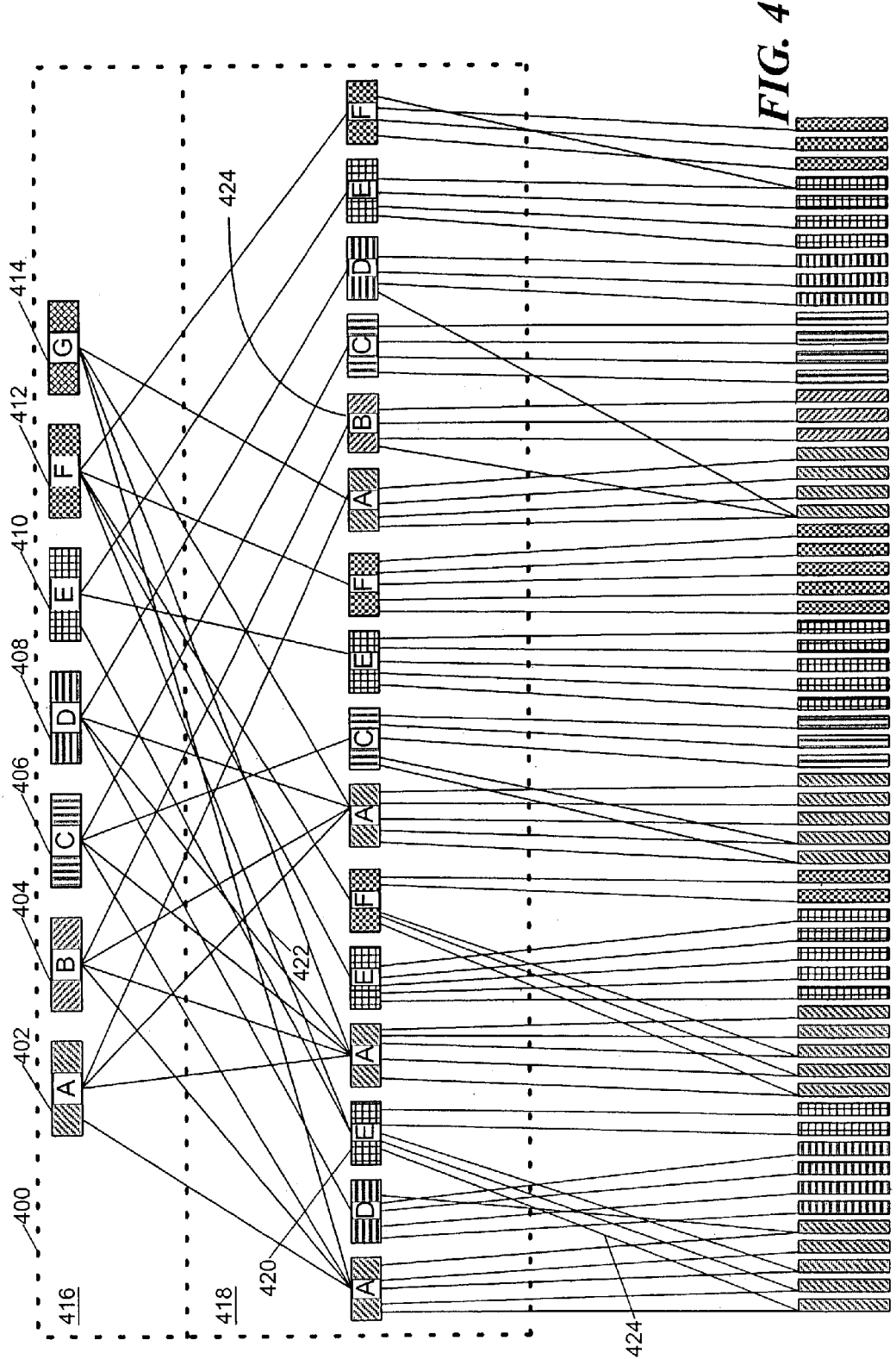
FIG. 4 is a schematic diagram illustrating shared deltas in a supervolume.

FIG. 4 shows graphically how the deltas share blocks and how the VMTs of the deltas A–G shown in FIG. 3 are arranged to contain pointers to the deltas with which they share data. FIG. 4 shows only LBAs 0 through 18 and illustrates seven VMTs each having two levels 416 and 418. These seven VMTs and the data blocks that are associated with them constitute seven deltas labeled delta A to delta F. Each VMT root node of nodes 402–414 has been labeled with the delta of which it is a part. For example, consider delta F, LBA 0. VMT-root node 412 in delta F shares a pointer to VMT-leaf node 420 in delta E as indicated schematically by line 422. At VMT leaf node 420, delta E shares a pointer (indicated by line 424) to the user data in delta A, for LBA 0. Other data sharing relationships are indicated in a similar fashion.

FIG. 4 also shows the modification process of the VMT. For example, delta G (414) has newly been created and shares all nodes with delta A (402.) Note that each node in the second level 418 is marked as belonging to delta A (402.) In order to preserve the original data copy, each node in the VMT that is created by a delta is marked as belonging to that delta. Only the creating delta can modify that node. If a subsequent delta must modify that node, it creates a new node and applies the modifications to it. Thus, delta B (404) shares three nodes at level 418 with delta A (402.) However, delta B has created a new fourth node 424 because it has written data with a different logical block address/physical block address pair for the data in delta A (402.)

A "delta tree" (DT) provides the ordering of the deltas needed to find the correct image of a covolume. In particular, a DT orders the deltas in a tree structure that records the ancestry of the individual deltas. In accordance with the principles of the invention, it is the structure of the DT, in combination with the deltas, which gives the copy process the ability to create both read-only and read-write copies, and which reduces creation time and maximizes data sharing.

To make use of the ordering of the DT, each covolume has a "natural" delta in the DT. The natural delta of a covolume is the delta that contains the most recent set of changes for the covolume. As such, the natural delta provides the starting point for the complete image of the covolume and the natural delta is searched first when looking for data. Through the structure of the DT, the covolume is further defined by ancestor deltas of the natural delta. These ancestor deltas are searched, starting with the parent of the natural delta and proceeding up to the root delta, when the desired data is not found in the natural delta or in any previously searched ancestors. Only through the ordering of the DT and the contents of the natural delta and all of its ancestors does the complete image of a covolume emerge.

To distinguish the deltas in the DT, each delta is given a unique label. Each delta retains the same label throughout the its entire lifetime. Once a delta has been removed from the DT, the label can be reused for a new delta. All changes made to a delta are stamped with the label so that the owning delta can be easily identified.

Figure 5:
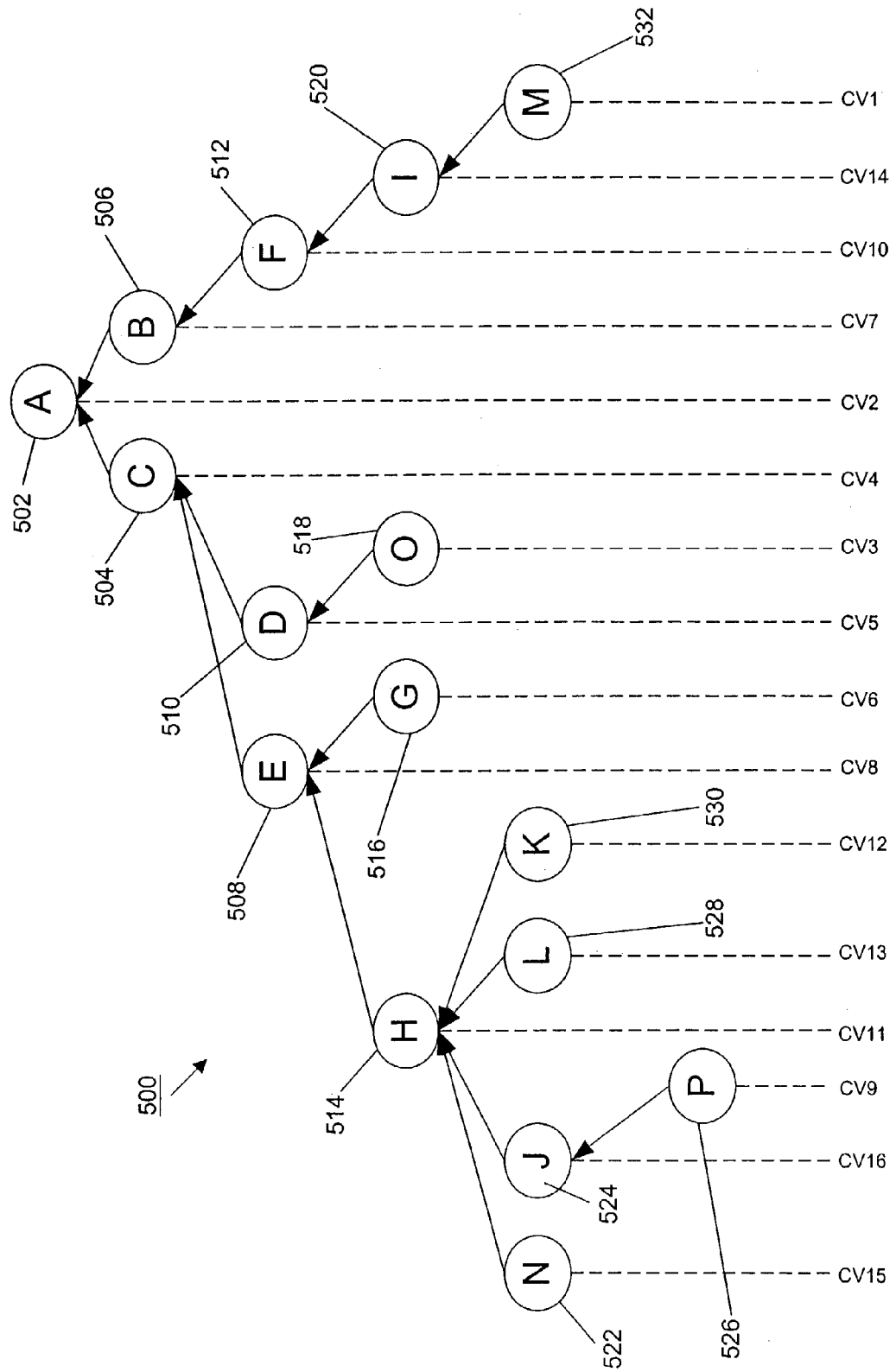
FIG. 5 is a schematic diagram showing an illustrative delta tree.

FIG. 5 shows an example DT 500 in which the circles 502–532 represent deltas. The letters in the circles 502–532 are the labels of the deltas. The solid arrows define parent-child relationships, with the children pointing to the parents. For example, deltas 504 and 506 are children of delta 502. At the bottom of the figure is a list of covolumes (for example, "cv1"), each of which refers to the natural delta of the covolume via a dashed line.

At the top of the DT 500 is the root delta 502. A DT, such as DT 500, always contains exactly one root delta. The root delta exists for the entire lifetime of the supervolume. A "leaf delta" is simply a leaf of the DT. Deltas 522, 526, 528, 530, 516, 518 and 532 are leaf deltas. A leaf delta can be modified by adding to, or changing, the user data. A leaf delta will be deleted if its covolume is deleted. A leaf delta can be combined with its parent delta if the parent delta's covolume is deleted.

A "shared delta" is a delta with two or more children. In FIG. 5, deltas 502, 504, 508 and 514 are shared deltas. A shared delta cannot be changed by the addition or modification of user data and a shared delta cannot be deleted. A shared delta can be combined with its parent delta if the parent delta's covolume is deleted.

A "non-leaf delta" is any delta that has exactly one child. The remaining deltas (506, 510, 512, 520 and 524) are non-leaf deltas. A non-leaf delta cannot be changed by the addition or modification of user data. A non-leaf delta cannot be deleted, but it can be combined with its only child delta if the non-leaf delta's covolume is deleted. A non-leaf delta can be combined with its parent delta if the parent delta's covolume is deleted.

The DT 500 has the following additional properties. The DT can have arbitrarily wide branching and is not restricted to a binary tree configuration. The number of children of a delta is not limited. The DT is not balanced so that the branches may vary in height. New deltas can descend from any existing delta.

Figure 6A:
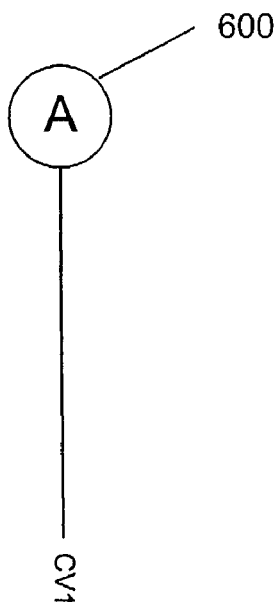
FIGS. 6A, 6B, 6C and 6D are schematic diagrams illustrating the creation of deltas.
Figure 6B:
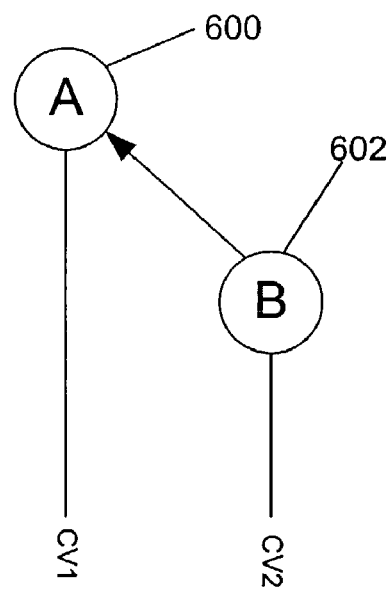
Figure 6C:
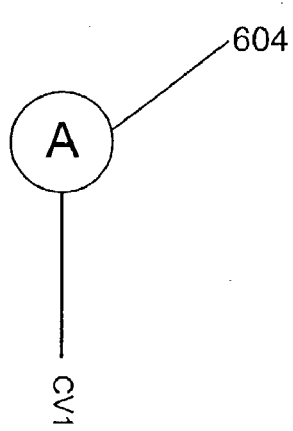
Figure 6D:
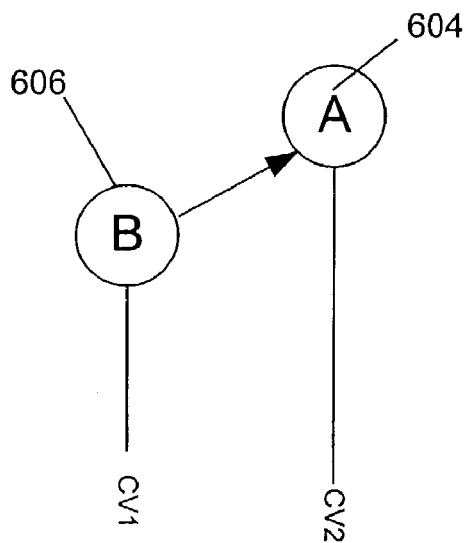

Creation and modification of a DT is illustrated in FIGS. 6A–6D. As shown in FIG. 6A, a newly created supervolume has a single, empty, leaf delta 600 labeled as delta A in FIG. 6A and consists of covolume cv1. There are two ways to create more deltas in such a supervolume. The first way is to create a read-write covolume from an existing read-only covolume with the result shown in FIG. 6B. The second way is to create a read-only covolume from an existing read-write covolume as illustrated in FIGS. 6C and 6D. When creating a read-write covolume cv2 from an existing read-only covolume cv1, one new leaf delta 602 is added to the DT, descended from the natural delta 600 of the read-only covolume cv1. The read-write covolume cv2 is given the new leaf delta 602 for its natural delta. The natural delta 600 of the read-only covolume cv1 does not change as illustrated in FIG. 6B.

FIG. 6C shows a delta 604 for an existing read-write covolume cv1 When creating a read-only covolume cv2 from an existing read-write covolume cv1, one new leaf delta 606 is added to the DT, descended from the natural delta 604 of the read-write covolume cv1 as illustrated in FIG. 6D. The natural delta of the read-write covolume cv1 changes to the new leaf delta 606. The natural delta of the read-only covolume cv2 is the original natural delta of the read-write covolume 604. Thus, the original natural delta of the read-write covolume becomes a non-leaf delta 604 as shown in FIG. 6D.

In accordance with the principles of the invention, the copy process also allows the creation of a read-write covolume from an existing read-write covolume and the creation of a read-only covolume from an existing read-only covolume. However, these latter types of covolume creation require two steps. To create a read-write covolume from an existing read-write covolume, it is necessary to create two new covolumes rather than just one. First, a read-only covolume is created from the existing read-write covolume as illustrated in FIGS. 6C and 6D. Then a read-write covolume is created from the new read-only covolume as illustrated in FIGS. 6A and 6B.

Similarly, to create a read-only covolume from a read-only covolume, a read-write covolume must first be created from the existing read-only covolume. Then the new read-only covolume can be created from the new read-write covolume.

There are two cases to consider for delta deletion. The first case is the deletion of a leaf delta and the second case is the consolidation of a non-leaf delta with its only child delta. Deletion of a shared delta is not allowed.

Figure 7A:
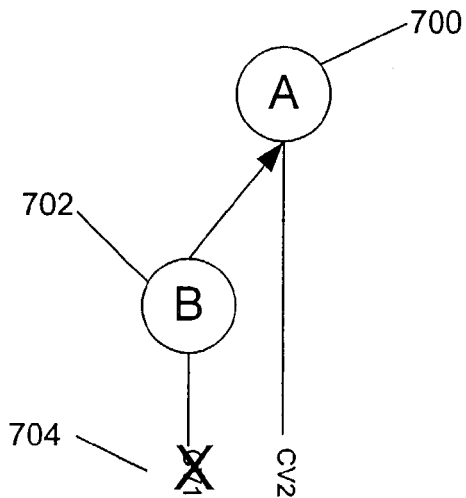
FIGS. 7A, 7B, 7C and 7D are schematic diagrams illustrating the deletion of deltas.
Figure 7B:
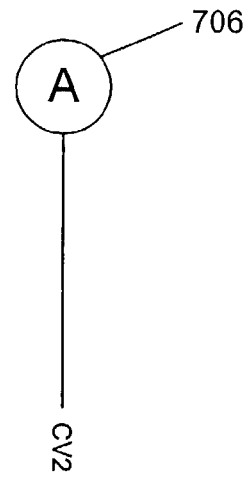

Deletion of a leaf delta is illustrated in FIGS. 7A and 7B. FIG. 7A shows a non-leaf delta 700 corresponding to covolume cv2 with a child leaf delta 702 corresponding to covolume cv1. Leaf delta 702 is deleted when the covolume cv1 of that delta 702 is deleted (as indicated by the "X" 704) and all data in the delta 702 is released. The result is shown in FIG. 7B. Once all the data in the delta 702 has been freed, the leaf delta label ("B") can be reused. If the deleted delta was the last delta in the DT, then the supervolume has also been deleted.

Figure 7C:
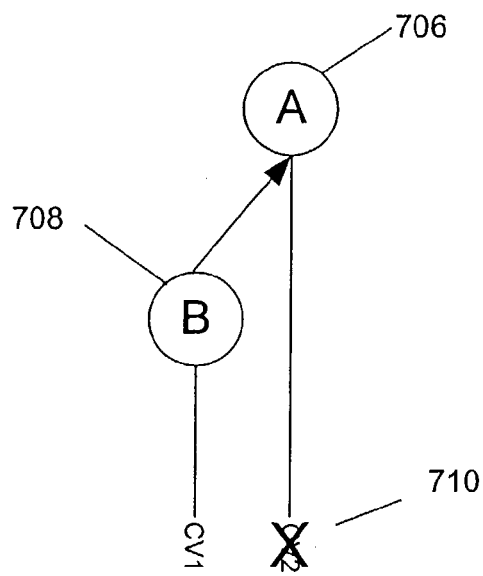
Figure 7D:
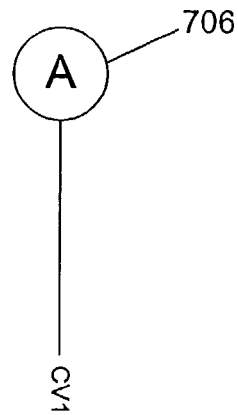

A consolidation operation, shown in FIGS. 7C and 7D, removes a delta from the DT by consolidating two deltas into one. FIG. 7C illustrates a non-leaf delta 706 corresponding to covolume cv2 with a child leaf delta 708 corresponding to covolume cv1. Consolidation occurs when the covolume cv2 of the non-leaf delta 706 is deleted as indicated by the "X" 710. The non-leaf delta 706 (the DT-parent delta) is consolidated with its only child delta 708 (the DT-child delta). All the data that was not shared by the DT-child delta is freed, since it is no longer needed. At the same time, all data owned by the DT-child delta is given to the DT-parent delta. When these modifications have been made, the two deltas have been consolidated under the DT-parent delta 706 label ("A") as indicted in FIG. 7D, and there is one less delta in the DT. The DT-child delta's label can then be reused. The ultimate effect of this procedure is to move data towards the root of the DT during covolume deletion.

For every logical block in a supervolume, there exists a subset of the DT called the "Local Delta Tree" (LDT). The LDT provides a mechanism to implement an ordered search of deltas that produces the complete image of a covolume. A LDT is defined by the modification history of the block, and each block may have a different LDT. The LDT for a block comes into existence with the first change made by a delta. When an initial change is made to a block by a delta that has not changed the block before, the LDT is updated to include the new delta, and to reflect change caused by the delta. If a particular block has been changed by only one delta, then only one copy of that block exists in the supervolume and the LDT for that block contains just the one delta. When a delta makes more than one change to a particular block, the LDT is not updated for any changes after the initial change. Thus, only the initial change by a delta, and the subsequent deletion of the delta from the supervolume, cause the LDT to change.

The LDT does not share the same exact structure as the DT, since the LDT contains a subset of the DT's deltas, but it does have a well-defined structure, given the list of deltas that have made changes to the related block. For example, the LDT parent of an LDT delta must be one of the DT ancestors of the LDT delta. Similarly, an LDT children set of an LDT delta will contain only the DT descendents of the LDT delta.

Because the root of an LDT might not be the same as the DT root, it is possible for more than one LDT to exist for any given block. This situation can happen when the DT root delta did not make a change to the block, but more than one DT descendent of the DT-root delta did make a change to the block. For the block in question, each of those DT descendent deltas becomes a LDT root of an independent LDT.

Figure 8B:
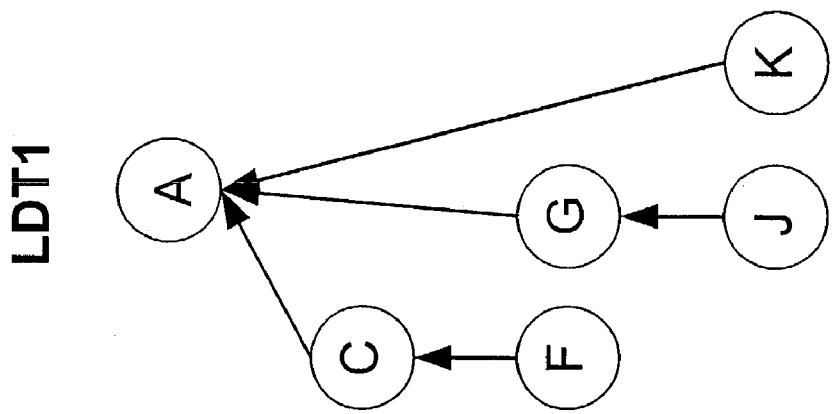
FIGS. 8A, 8B, 8C and 8D are schematic diagrams illustrating local delta trees.
Figure 8A:
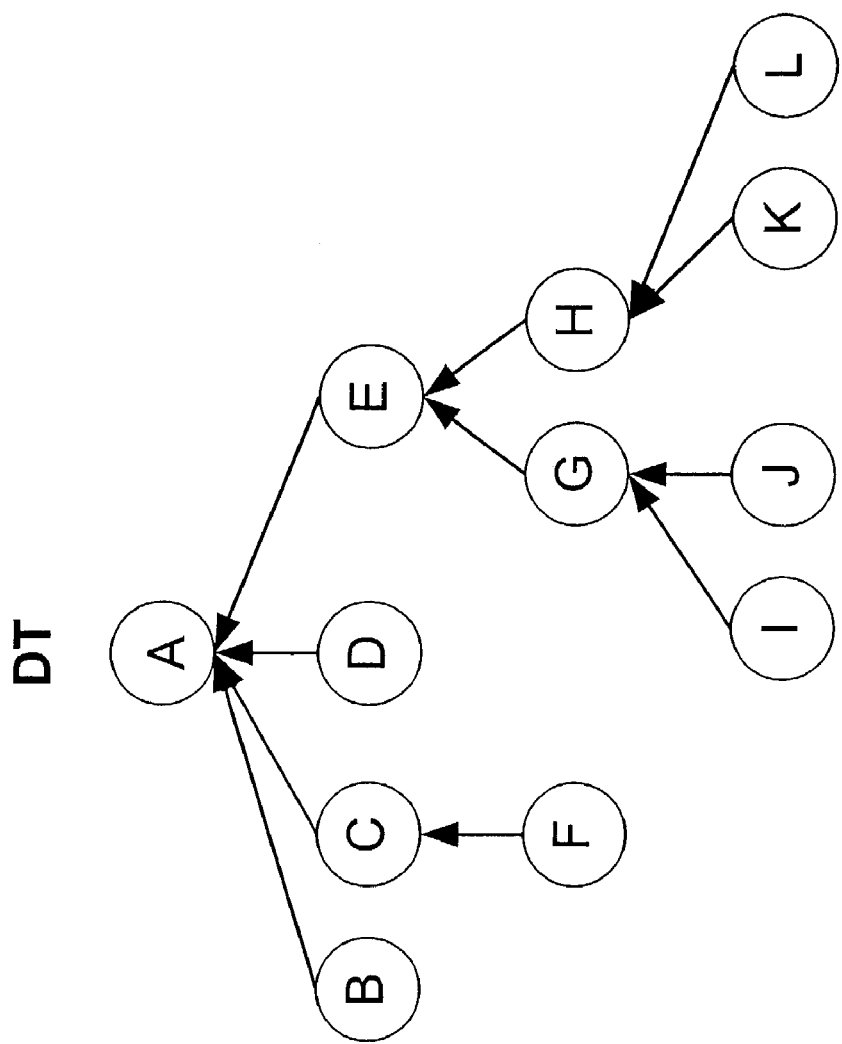
Figure 8D:
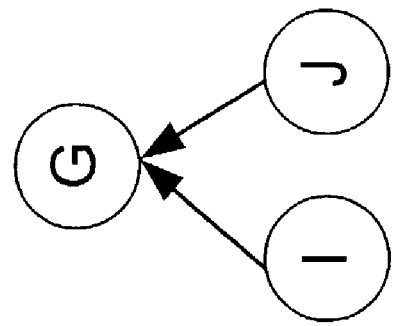
Figure 8C:
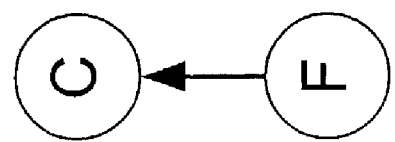

FIGS. 8A–8D illustrates the differences between a DT and some possible LDTs. FIG. 8A shows a complete DT comprised of deltas A–L. FIGS. 8B–8D illustrate three LDTs (out of many more possible LDTs) that are related to the DT shown in FIG. 8A. Due to the differences between DTs and LDTs, the structure of the LDTs varies from the DT shown in FIG. 8A. For example, in the LDT shown in FIG. 8B, deltas B, D, E, I, H, and L do not exist. This means that no changes were made to the corresponding block by those deltas. In addition, in the LDT shown in FIG. 8B, delta K descends immediately from delta A, whereas the DT in FIG. 8A has two intermediate deltas (E and H) between deltas A and K. This latter construction could occur in the following manner. Just before the corresponding block was changed by delta K, delta K was still sharing the block from delta A. Thus, when the block was modified by delta K, delta K descends from delta A in the LDT shown in FIG. 8B.

FIGS. 8C and 8D illustrate situations where multiple LDTs might exist for the same block. Such situations could arise where the corresponding block was never changed by the root delta A, but later was changed independently by both deltas C and G. In this case, both deltas C and G become the LDT roots for their respective LDTs shown in FIGS. 8C and 8D, respectively.

In one embodiment of the invention, six data structures are used to implement the copy process. These structures are the "Covolume Handle" (CV_HANDLE) data structure, the "Delta Tree Block" (DTREE) structure, the "Delta Tree Deltas" (DTREE_DELTA) structure, the "Map Node Block" (MNODE) structure, the "Reference Block" (REF) structure, and the Reference Block Deltas (REF_DELTA) structure. Sets of these data structures, and any user data blocks, collectively compose individual supervolumes.

Figure 9:
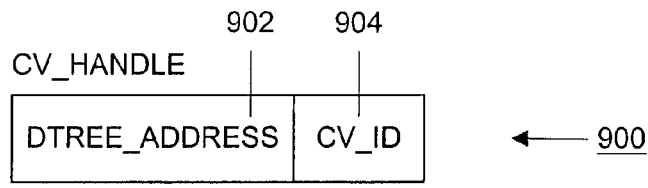
FIG. 9 is a schematic diagram illustrating a CV_HANDLE data structure.

Clients of the copy process identify a covolume through the CV_HANDLE structure 900 illustrated in FIG. 9. The CV_HANDLE contains the physical address 902 of a related DTREE (dtree_address) and a covolume identifier 904 (cv_id). The covolume identifier 904 is used to identify the covolume's natural delta.

Figure 10:
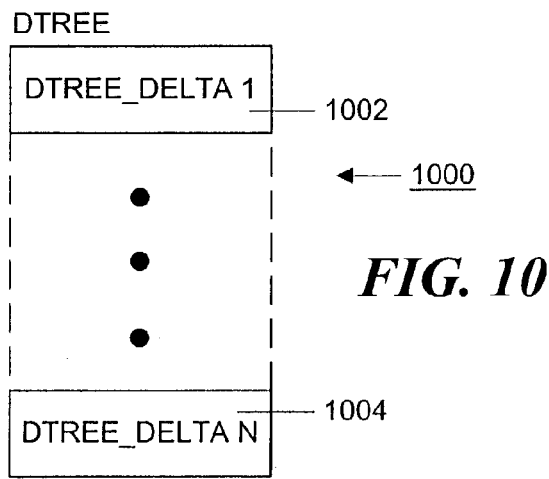
FIG. 10 is a schematic diagram illustrating a DTREE data structure.

The DTREE structure is the central data structure in the copy process and is shown in FIG. 10. A DTREE structure 1000 contains a list of pointers to DTREE_DELTA structures (dtree_delta) of which two pointers, DTREE_DELTA pointers 1002 and 1004, are illustrated. There is exactly one DTREE structure in each supervolume. A DTREE structure is defined by its physical block address (address) or implicitly by a CV_HANDLE structure such as that shown in FIG. 9.

Figure 11:
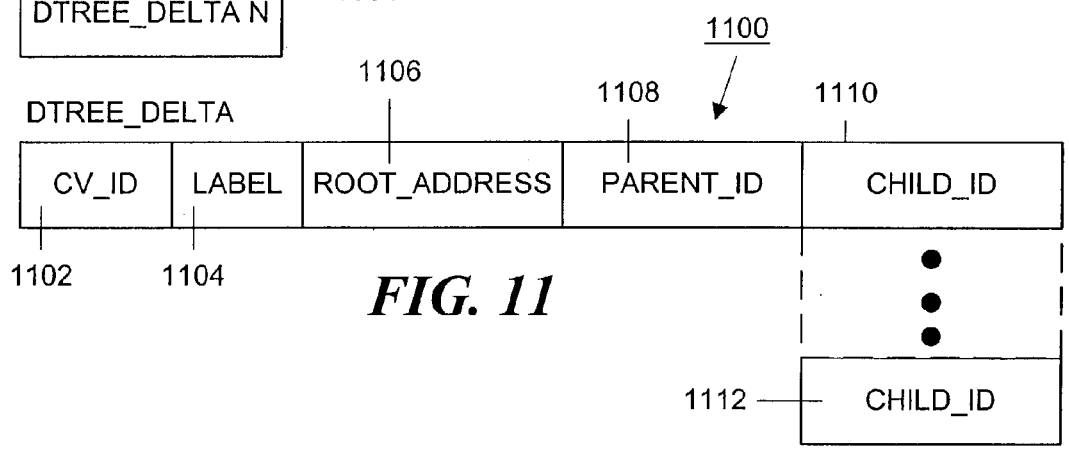
FIG. 11 is a schematic diagram illustrating a DTREE_DELTA data structure.

An illustrative DTREE_DELTA data structure 1100 is shown in FIG. 11 and defines one delta in the delta tree. Each DTREE_DELTA structure contains a covolume identifier (cv_id) 1102, the delta label (label) 1104, the address of an MNODE structure (discussed below) that constitutes the VMT root node (root_address) 1106, the identity of the DT parent (parent_id) 1108, and a list of the identities of any DT children (child_id) of which two, 1110 and 1112, are shown. A DTREE_DELTA 1100 is defined explicitly by a DTREE address and a covolume identifier, or implicitly by a CV_HANDLE data structure.

Figure 12:
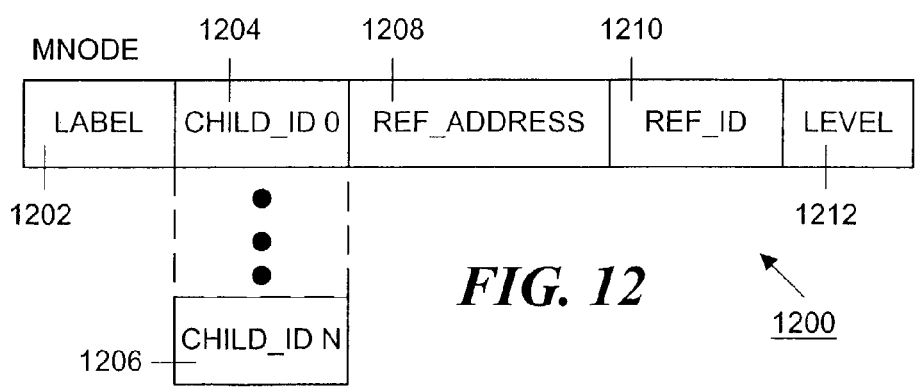
FIG. 12 is a schematic diagram illustrating an MNODE data structure.

Each delta is composed of MNODE data structures of which one 1200 is shown in FIG. 12. Taken together, the MNODE structures define the aforementioned volume map tree, which is the index structure that maps an LBA to a physical block address. A MNODE 1200 contains the label 1202 (label) of the delta to which the MNODE belongs and a list of physical block addresses (child IDs) of which two, 1204 and 1206, are shown. These physical block addresses are the addresses either of the node's VMT children or of user data blocks. In particular, the child IDs of leaf MNODEs (with a level value of "zero") in the VMT contain the physical block addresses of user data blocks, while MNODEs at other levels in the VMT contain the physical block addresses of other MNODE data structures.

The MNODE structure also contains the physical block address 1208 (ref_address) of a REF structure (discussed below) that defines an LDT to which the MNODE belongs, the identity 1210 (ref_id) of a REF_DELTA data structure corresponding to the MNODE in the REF structure, and the VMT level 1212 (level) of the MNODE. A MNODE structure is defined explicitly by its physical block address (address) or implicitly by a CV_HANDLE and an LBA, or a logical location. MNODEs in a particular supervolume at the same logical location but from different deltas may have any or all of their corresponding VMT children addresses in common. This happens when a delta has not made changes to the VMT child, and therefore still shares the data from a DT ancestor delta. Each delta in a delta tree has a distinct VMT root MNODE.

Figure 13:
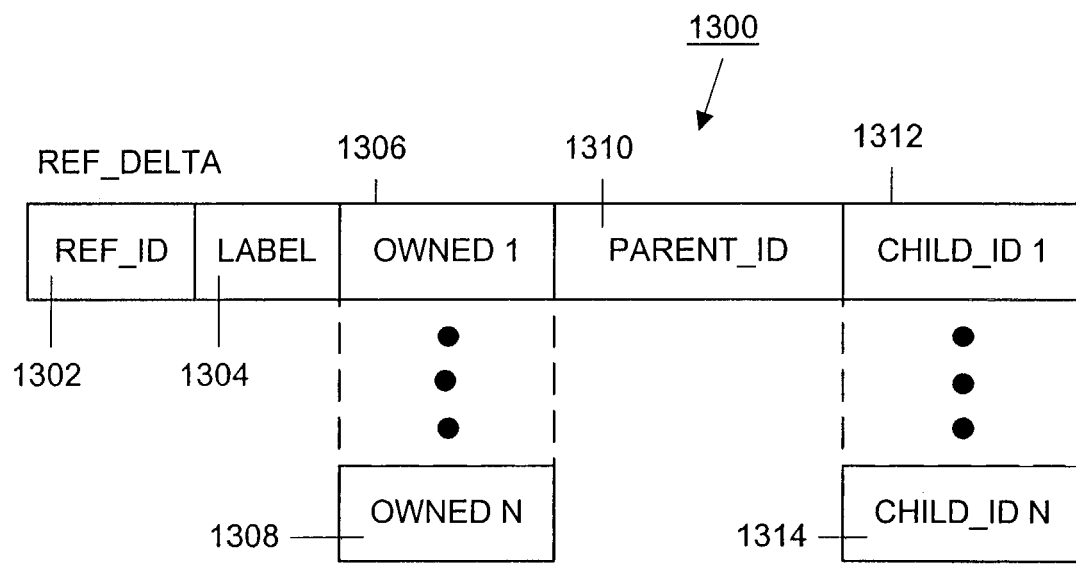
FIG. 13 is a schematic diagram illustrating a REF_DELTA data structure.

Each REF_DELTA data structure defines one delta in an LDT and is illustrated in FIG. 13. The REF_DELTA data structure 1300 contains an identifier 1302 (ref_id) of the REF data structure (discussed below) to which it belongs, the label 1304 (label) of the DT delta with which the REF_DELTA is associated, a list of the VMT children that the delta owns at the logical location (owned) of which two children, 1306 and 1308 are shown, the identity of the LDT parent 1310 (parent_id), and the identities of the LDT-children (children_ids) of which two, 1312 and 1314 are shown in FIG. 13. The list of owned VMT children 1306, 1308 is used to determine when VMT children of the corresponding MNODEs can be freed. A REF_DELTA data structure 1300 is defined explicitly by a REF address and an identifier.

Figure 14:
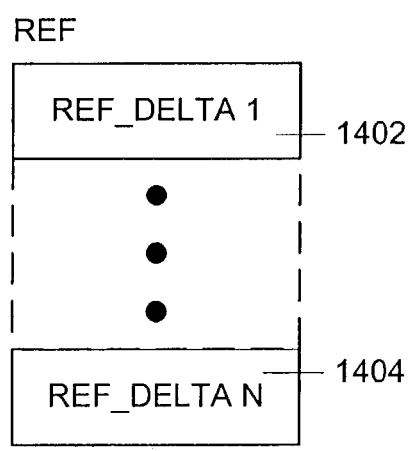
FIG. 14 is a schematic diagram illustrating a REF data structure.

Each REF data structure, as shown in FIG. 14, records the LDTs for each logical location that contains more than one delta. A REF data structure 1400 contains a list of pointers to REF_DELTA structures of which two, 1402 and 1404, are shown. A REF structure 1400 is defined explicitly by its physical block address (address). The combination of all the REF_DELTA owned lists and the LDT for the REF 1400, effectively define the LDTs for the VMT children of the MNODEs that refer to the REF structure. Logical locations that contain no LDTs and logical locations where all LDTs contain only one delta do not have associated REF structures. All MNODEs in a supervolume that are at a particular logical location and in deltas that share a common LDT ancestor, and the common delta itself, share the same REF data structure.

Figure 15A:
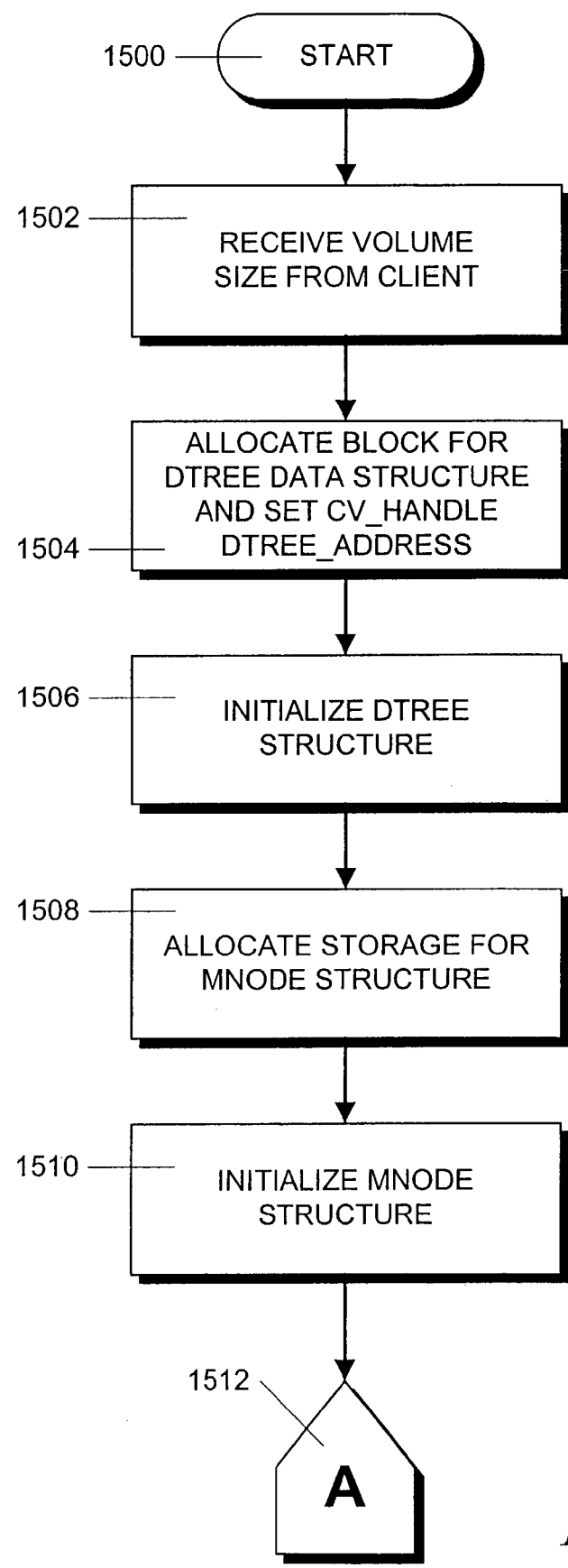
FIGS. 15A and 15B, when placed together, form a flowchart showing the steps in an illustrative procedure for the creation of a supervolume.
Figure 15B:
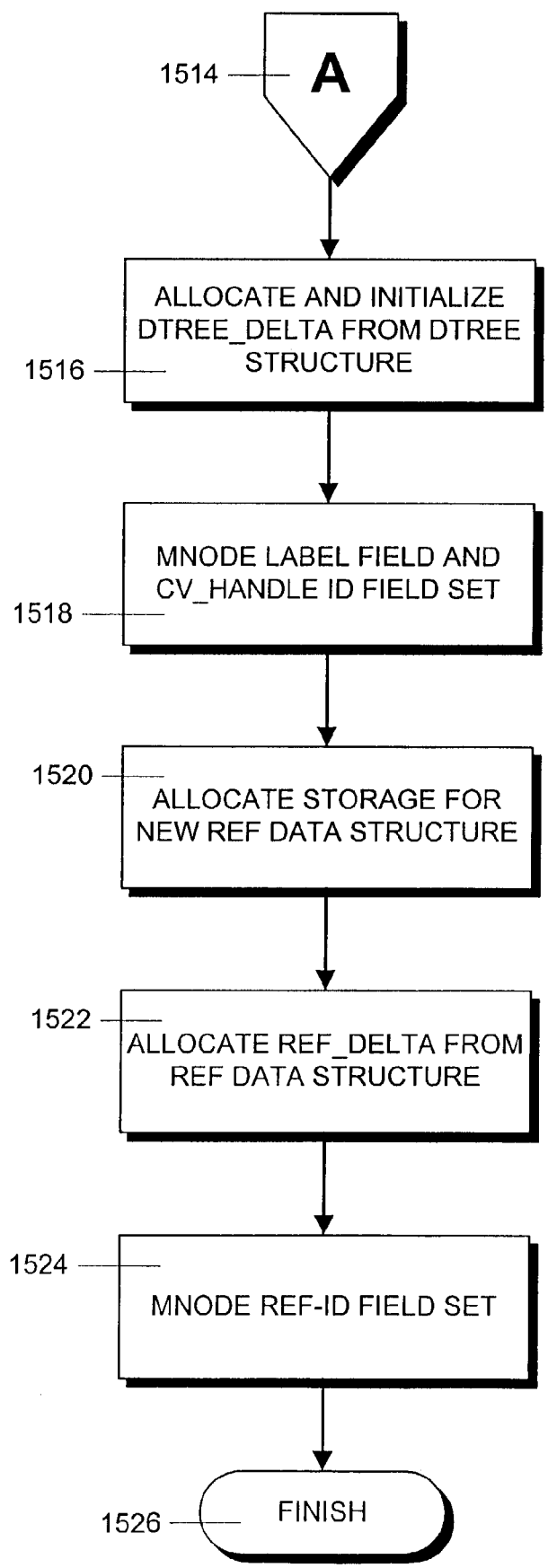

A set of example procedures follows to illustrate the operation of the illustrative copy system. The first procedure shown in FIGS. 15A and 15B, which when placed together, illustrate the creation of a supervolume, which implies the creation of a first covolume within the supervolume. This procedure starts in step 1500 and proceeds to step 1502 where the maximum volume size, SIZE, is received from the client. Next, in step 1504, the storage system is instructed to allocate a storage block for the DTREE data structure that is shown in FIG. 10 and the dtree_address in the CV_HANDLE data structure is set to the address of the DTREE data structure.

In step 1506, the DTREE data structure is initialized to contain no deltas. Then, in step 1508, the storage sub-system allocates a storage block for the MNODE structure of the VMT root node for the first covolume. The MNODE structure is then initialized in step 1510 by setting its level field to the number of VMT levels that will be needed to represent a volume of size (SIZE) and by setting all VMT child address fields to null. The process then proceeds, via off-page connectors 1512 and 1514, to step 1516.

Next, in step 1516, the storage system allocates a DTREE_DELTA structure (DTREE_DELTA$_{NEW}$) from the DTREE structure. This DTREE_DELTA$_{NEW}$ structure is then initialized by setting its root_address field to the address of the aforementioned MNODE data structure. In step 1518, the label field of the MNODE structure created in step 1508 is set to the value of the label field in the DTREE_DELTA$_{NEW}$ structure. Further, the cv_id field of the CV_HANDLE data structure is set to the value of the cv_id field on the DTREE_DELTA$_{NEW}$ structure.

In step 1520, the storage system allocates a storage block for a new REF data structure and, in step 1522, the storage system allocates a REF_DELTA data structure from the REF structure. The new REF_DELTA data structure is the root of the LDT. Then, in step 1524, the ref_id field of the MNODE structure is set to the value of the ref_id field of the new REF_DELTA structure. At this point all VMT children of the MNODE are owned by the MNODE. Finally, the process ends in step 1526 and the CV_HANDLE data structure is returned to the client.

Figure 16A:
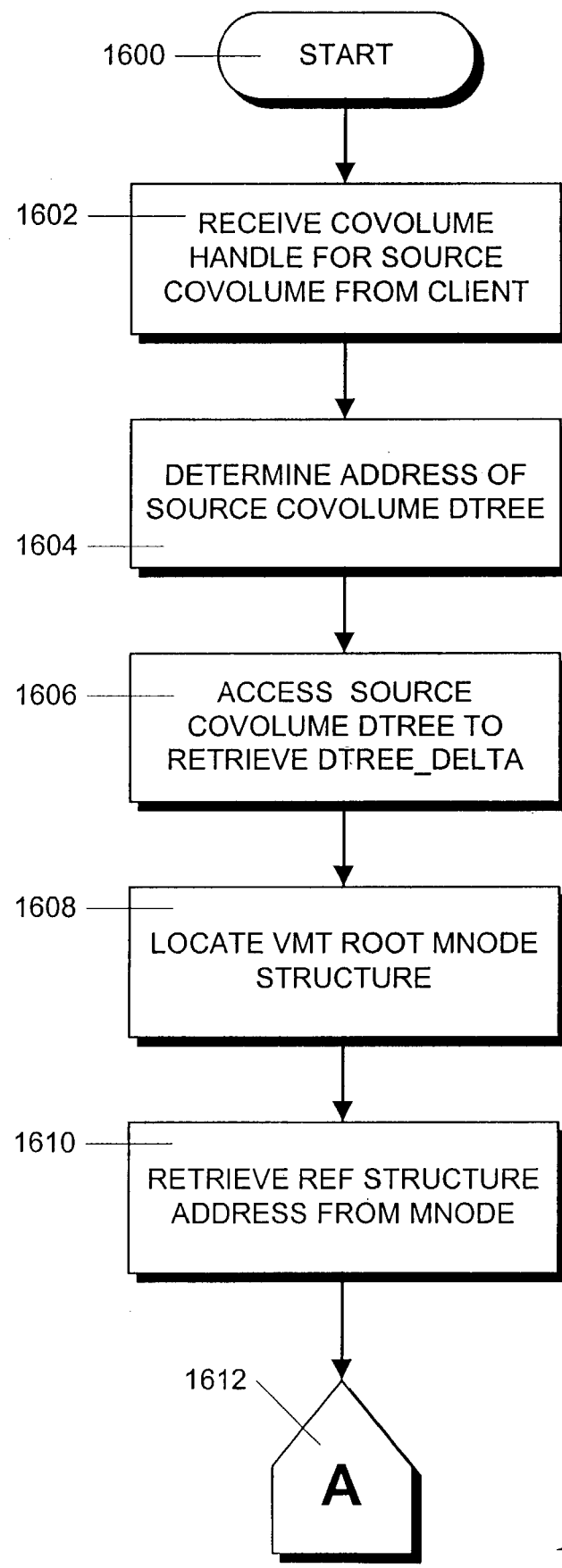
FIGS. 16A and 16B, when placed together, form a flowchart showing the steps in an illustrative procedure for the creation of a read-only covolume from an existing read-write covolume.
Figure 16B:
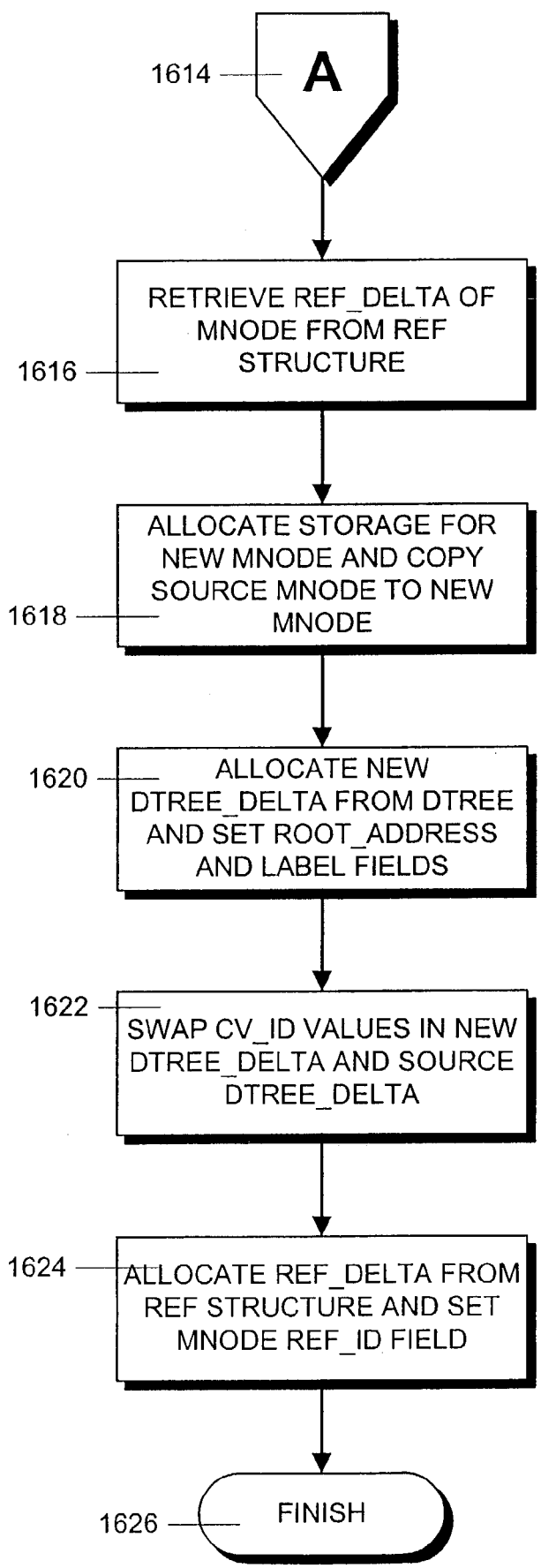

The second illustrative procedure is shown in FIGS. 16A and 16B, which when placed together, illustrate a procedure that creates a read-only covolume called the "new covolume", from an existing read-write covolume called the "source covolume". The new covolume will be an exact copy of the source covolume at the time the new covolume was created, even if the source covolume continues to change after the creation of the new covolume.

The process starts in step 1600 and proceeds to step 1602 where the covolume handle for the source covolume, CV_HANDLE$_{SOURCE}$, is received from the client. A covolume handle of the new covolume, CV_HANDLE$_{NEW}$, will be returned to the client as illustrated below.

In step 1604, the address of the source covolume DTREE is determined from the dtree_address field of the CV_HANDLE$_{SOURCE}$ data structure. The dtree_address field in the CV-HANDLE data structure corresponding to the new covolume, CV_HANDLE$_{NEW}$, is set to the value of the dtree_address field in the CV_HANDLE$_{SOURCE}$ data structure. Next, in step 1606, the DTREE of the source covolume is accessed using the value of the cv_id field of the CV_HANDLE$_{SOURCE}$ data structure to locate and retrieve the DT_DELTA structure of the source covolume (DTREE_DELTA$_{SOURCE}$).

Next, in step 1608, the VMT root MNODE structure of the source covolume is located using the value of the root_address field of the source DTREE_DELTA as the address. In step 1610, the source MNODE structure (MNODE$_{SOURCE}$) is accessed to retrieve the address of the associated REF data structure address from the value of the ref_address field. The process then proceeds, via off-page connectors 1612 and 1614 to step 1616.

In step 1616, the located REF data structure is accessed to retrieve the REF_DELTA (REF_DELTA$_{SOURCE}$) of the MNODE$_{SOURCE}$ data structure by using the value of the ref_id field of the MNODE$_{SOURCE}$ data structure to access the REF data structure.

In step 1618, the storage system allocates a storage block for an MNODE data structure (MNODE$_{NEW}$) representing the VMT root of the new delta and copies the MNODE$_{SOURCE}$ data structure to the MNODE$_{NEW}$ data structure.

In step 1620, the storage system allocates a DTREE_DELTA from the DTREE data structure, DTREE_DELTA$_{NEW}$, with a parent of DTREE_DELTA$_{SOURCE}$. The root_address field of DTREE_DELTA$_{NEW}$ is set to the value of the address of the new MNODE data structure (MNODE$_{NEW}$) and the value of the label field in MNODE$_{NEW}$ is set to the value of the label field in DTREE_DELTA$_{NEW}$.

Then, in step 1622, the value of the cv_id field in the DTREE_DELTA$_{NEW}$ data structure is swapped with the value of the cv_id field in the DTREE_DELTA$_{SOURCE}$ data structure. In step 1624, the storage system allocates a REF_DELTA from the REF structure (REF_DELTA$_{NEW}$) with an LDT parent of REF_DELTA$_{SOURCE}$. The value of the ref_id field of MNODE$_{NEW}$ is set to the value of the ref_id field of the new REF_DELTA (REF_DELTA$_{NEW}$). Finally, the process finishes in step 1626 where the CV_HANDLE$_{NEW}$ data structure is returned to the client.

Figure 17A:
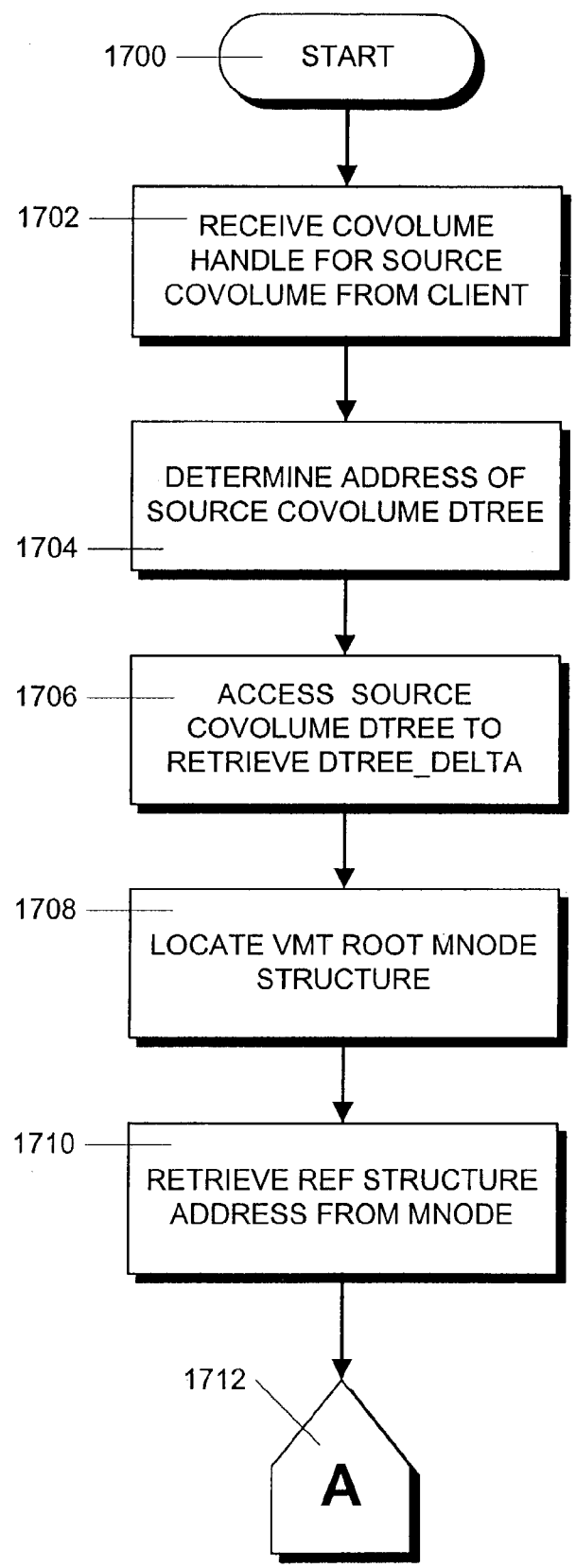
FIGS. 17A and 17B, when placed together, form a flowchart showing the steps in an illustrative procedure for the creation of a read-write covolume from an existing read-only covolume.
Figure 17B:
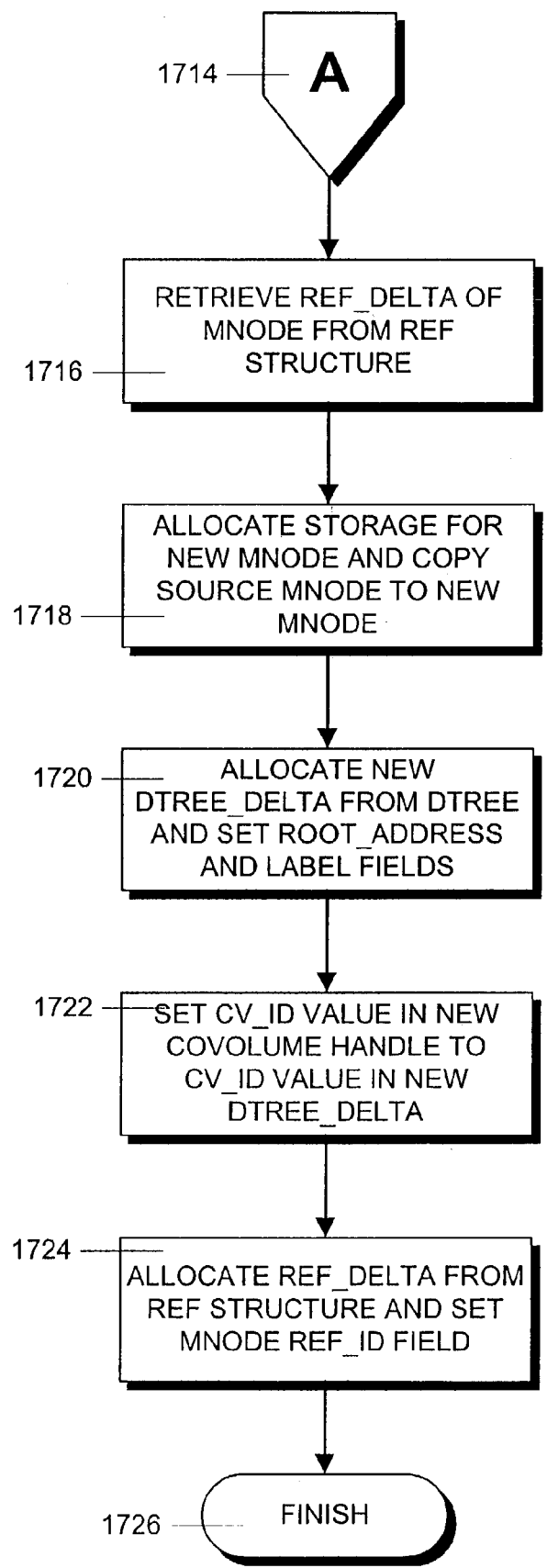

The third illustrative procedure creates a read-write covolume called a "new covolume", from an existing read-only covolume called a "source covolume". The new covolume will be an exact copy of the source covolume at the time the new covolume was created. If the new covolume is changed, the source covolume will not change. This routine is shown in FIGS. 17A and 17B, which when placed together, illustrate the steps in the process. The process begins in step 1700 and proceeds to step 1702 where the covolume handle for the source covolume, CV_HANDLE$_{SOURCE}$, is received from the client. A covolume handle for the new covolume, CV_HANDLE$_{NEW}$, will be returned to the client, as discussed below.

In step 1704, the value of the dtree_address field of the CV_HANDLE$_{SOURCE}$ structure is used to determine the address of the DTREE and the dtree_address field of the new CV_HANDLE (CV_HANDLE$_{NEW}$) is set to the value of the dtree_address field of the CV_HANDLE$_{SOURCE}$ structure.

In step 1706, the DTREE is accessed with the value of the cv_id field of the CV_HANDLE$_{SOURCE}$ structure to locate and retrieve the DTREE_DELTA of the source covolume (DTREE_DELTA$_{SOURCE}$). Next, in step 1708, the address of the VMT root MNODE of the source delta (MNODE$_{SOURCE}$) is retrieved from the root_address field of the located DTREE_DELTA$_{SOURCE}$ structure.

In step 1710, the MNODE$_{SOURCE}$ is accessed and the address of the REF structure associated with the MNODE$_{SOURCE}$ is obtained from the ref_address field of the MNODE$_{SOURCE}$ structure. The process then proceeds, via off-page connectors 1712 and 1714, to step 1716. The REF structure is accessed in step 1716 to determine the REF_DELTA of the MNODE$_{SOURCE}$ structure by using the value of the ref_id field in the MNODE$_{SOURCE}$ structure to access the REF structure.

Next, in step 1718, the storage system allocates a storage block for the VMT-root of the new delta, MNODE$_{NEW}$ and copies the contents of the MNODE$_{SOURCE}$ data structure to the MNODE$_{NEW}$ data structure. Then, in step 1720, the storage system allocates a delta (DTREE_DELTA$_{NEW}$) from the DTREE structure, with the DTREE parent of DTREE_DELTA$_{SOURCE}$, the root_address field of DTREE_DELTA$_{NEW}$ is set to the address of the new MNODE structure (MNODE$_{NEW}$) and the label field of the MNODE$_{NEW}$ structure is set to the value of the label field of the DTREE_DELTA$_{NEW}$ structure. In step 1722, the cv_id field of the CV_HANDLE of the new covolume (CV_HANDLE$_{NEW}$) is set to the value of the cv_id field in the DTREE_DELTA$_{NEW}$ structure.

The process then proceeds to step 1724 where the storage system allocates a REF_DELTA, REF_DELTA$_{NEW}$, from the REF structure with an LDT parent of REF_DELTA$_{SOURCE}$. The ref_id field of the new MNODE structure (MNODE$_{NEW}$) is set to the value of the ref_id field in the new REF_DELTA$_{NEW}$ structure. The process then finishes in step 1726 where the CV_HANDLE$_{NEW}$ structure is returned to the client.

Figure 18:
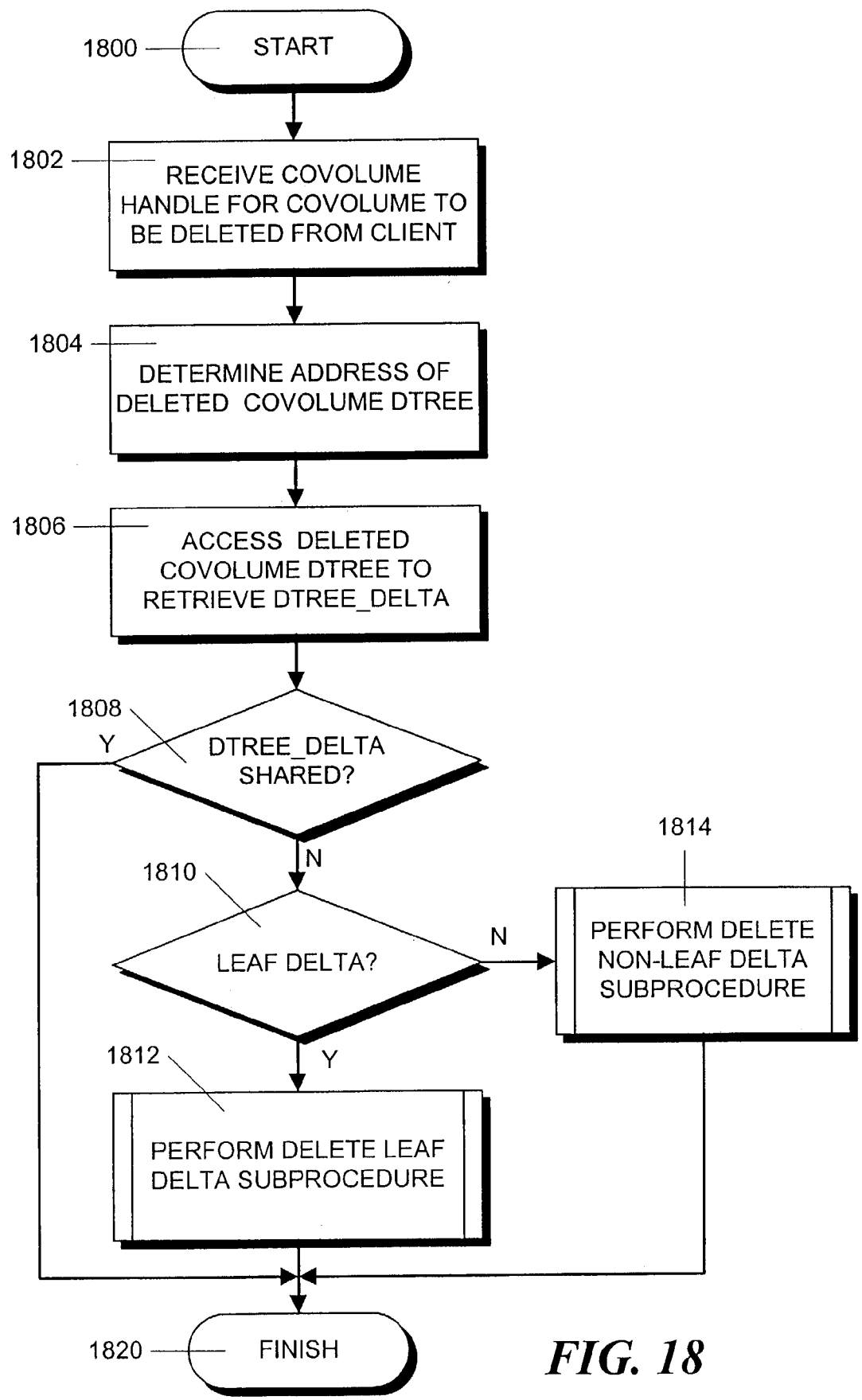
FIG. 18 is a flowchart showing the steps in an illustrative procedure for deleting a covolume.

A fourth illustrative procedure, shown in FIG. 18, deletes a covolume. This process starts in step 1800 and proceeds to step 1802 where a covolume handle for the covolume to delete, CV_HANDLE is received from the client. In step 1804, the address of the DTREE is determined from the value of the dtree_address field in the CV_HANDLE structure. Next, in step 1806, the DTREE is accessed with the address and the value of the cv_id field in the CV_HANDLE structure to obtain the DTREE_DELTA to be deleted (DTREE_DELTA$_{DELETE}$).

In step 1808, a determination is made whether the retrieved DTREE_DELTA is shared. This is done by examining the child ID list. When there are two or more non-null addresses in the list, the DTREE_DELTA$_{DELETE}$ is shared. If the DTREE_DELTA$_{DELETE}$ is shared as determined in step 1808, then a delete operation is not allowed and the process finishes in step 1820.

Figure 21:
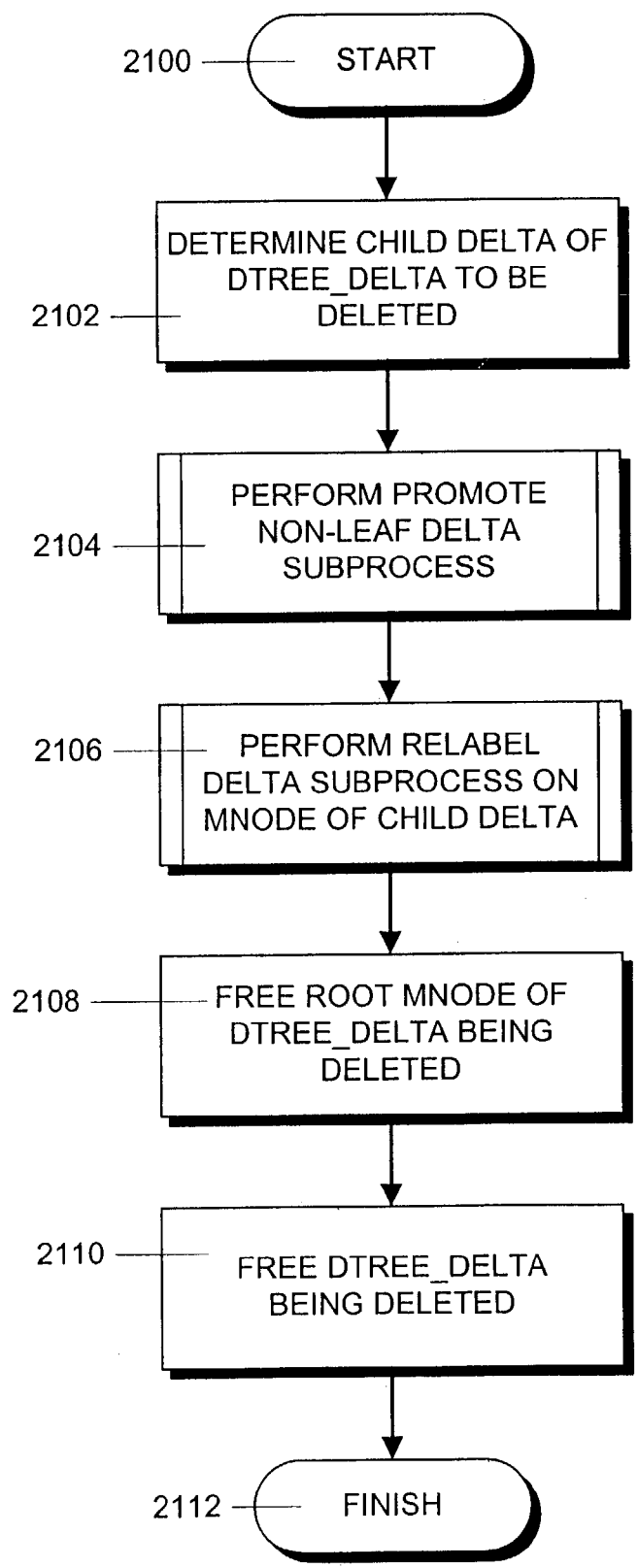
FIG. 21 is a flowchart showing the steps in an illustrative sub-procedure for deleting a non-leaf delta.

Alternatively, if the DTREE_DELTA$_{DELETE}$ is not shared as determined in step 1808, then in step 1810, a determination is made whether the DTREE_DELTA$_{DELETE}$ is a leaf delta. If so, the process proceeds to step 1812 where a delete leaf delta sub-procedure illustrated in FIG. 19 and described below is executed. Alternatively, if in step 1810, it is determined that the DTREE_DELTA$_{DELETE}$ is a non-leaf delta, then the process proceeds to step 1814 where a delete non-leaf delta sub-procedure is executed as shown in FIG. 21 and discussed below. Finally, the process proceeds in either case to finish in step 1820.

Figure 19:
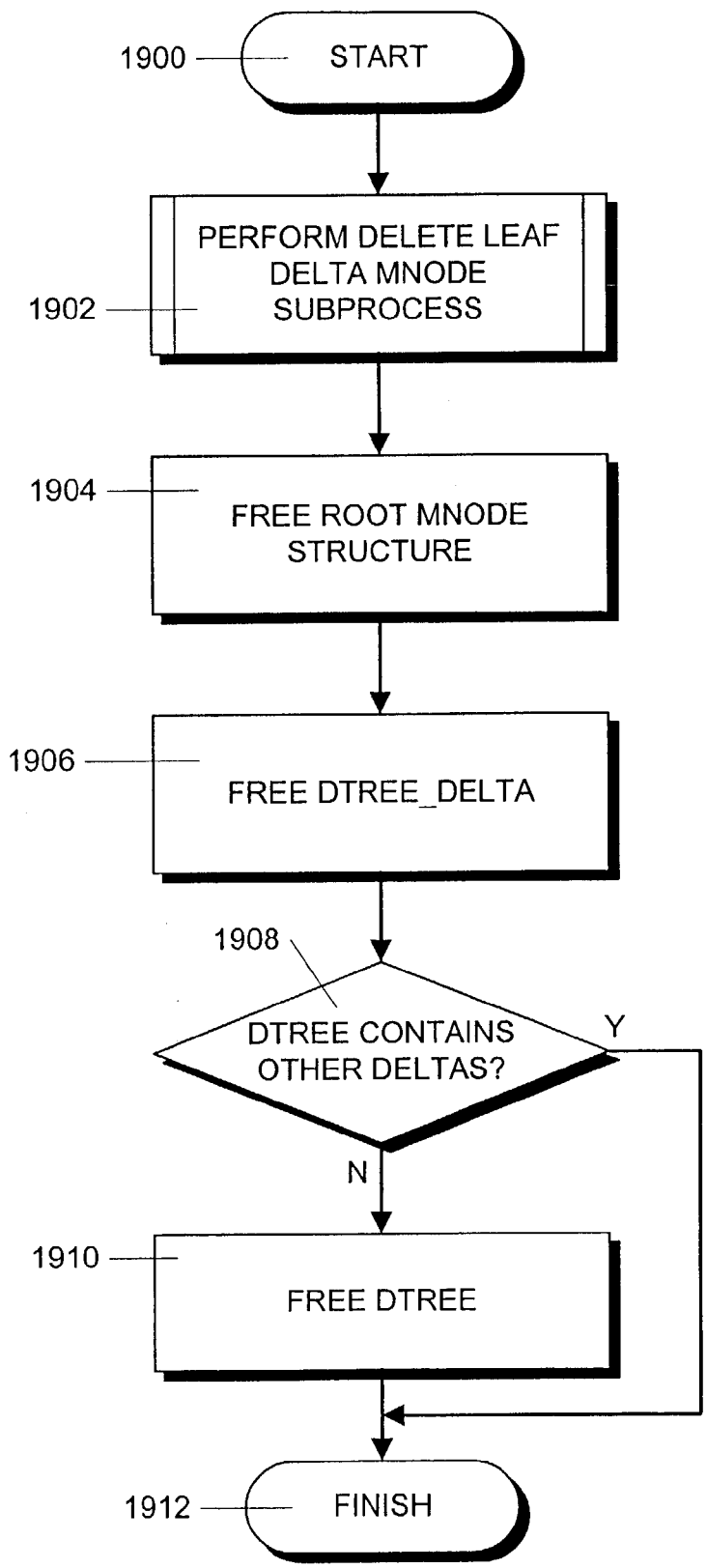
FIG. 19 is a flowchart showing the steps in an illustrative sub-procedure for deleting a leaf delta.

An illustrative delete leaf delta sub-procedure is illustrated in FIG. 19. This process begins in step 1900 and proceeds to step 1902 where the delete leaf delta MNODE sub-procedure that is shown in FIG. 20 and described below is performed using the address of the VMT root MNODE structure contained in the root_address field of the associated DTREE_DELTA$_{DELETE}$ structure. Then, in step 1904, the VMT root MNODE structure is freed. In step 1906, the DTREE_DELTA$_{DELETE}$ structure is freed. Next, in step 1908, a determination is made whether there are still allocated deltas in the DTREE. If so, the process proceeds to finish in step 1912. Alternatively, if in step 1908, it is determined that allocated deltas still exist in the DTREE structure, then the process proceeds to step 1910 where the DTREE is freed because the supervolume contains no covolumes and the process finishes in step 1912.

Figure 20A:
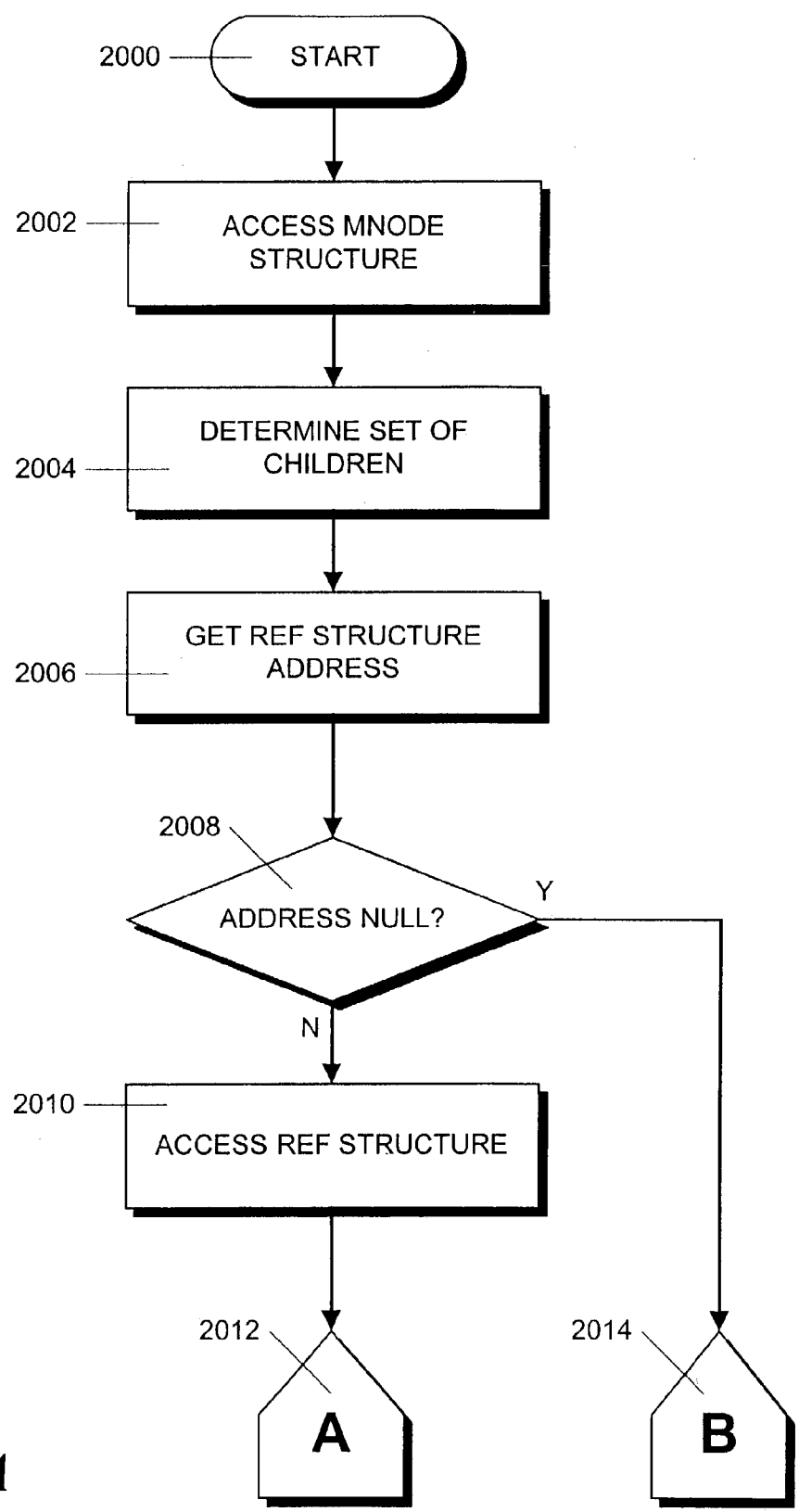
FIGS. 20A, 20B and 20C, when placed together, form a flowchart showing the steps in an illustrative sub-procedure for deleting a leaf delta MNODE structure.
Figure 20B:
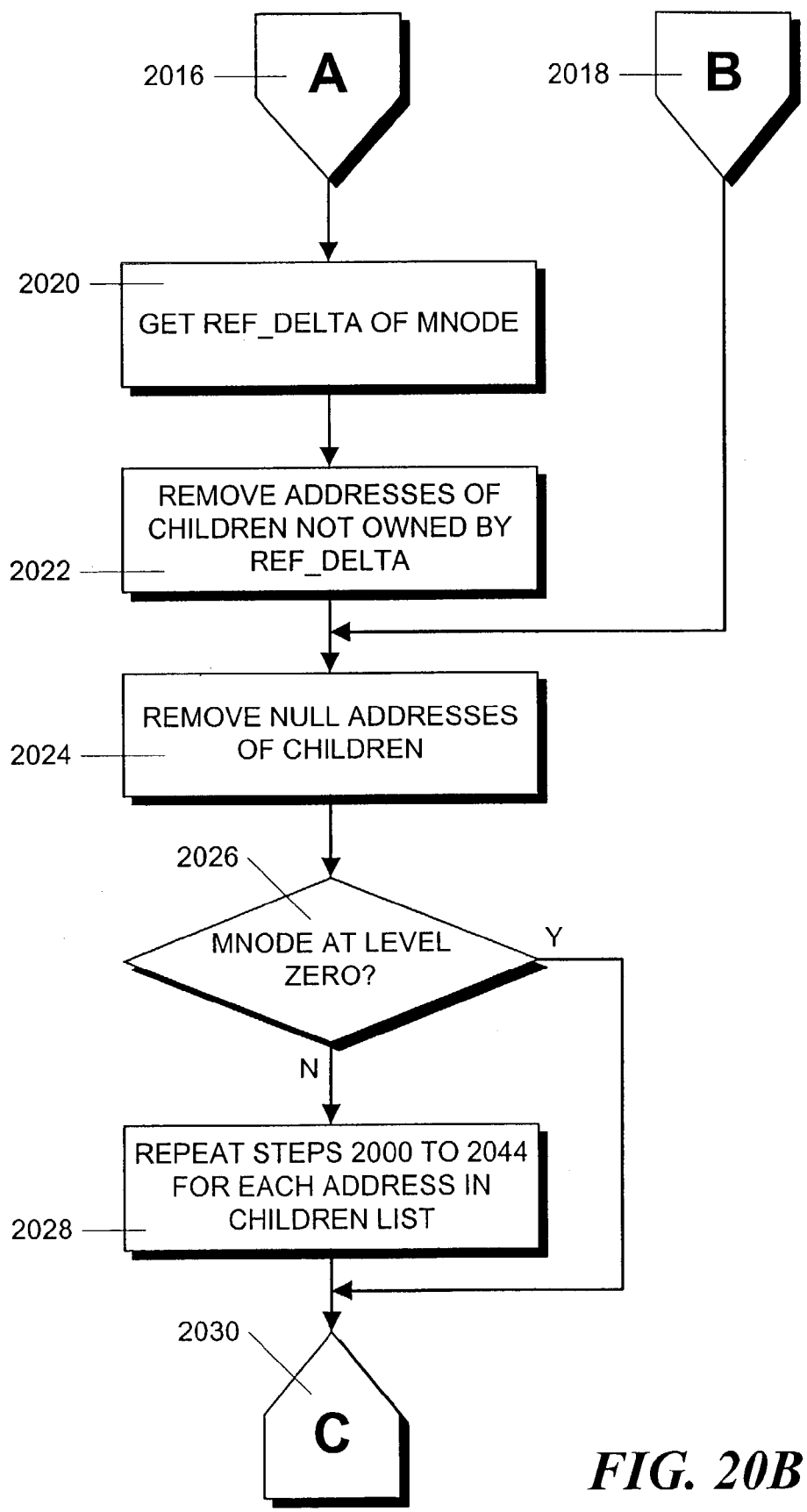
Figure 20C:
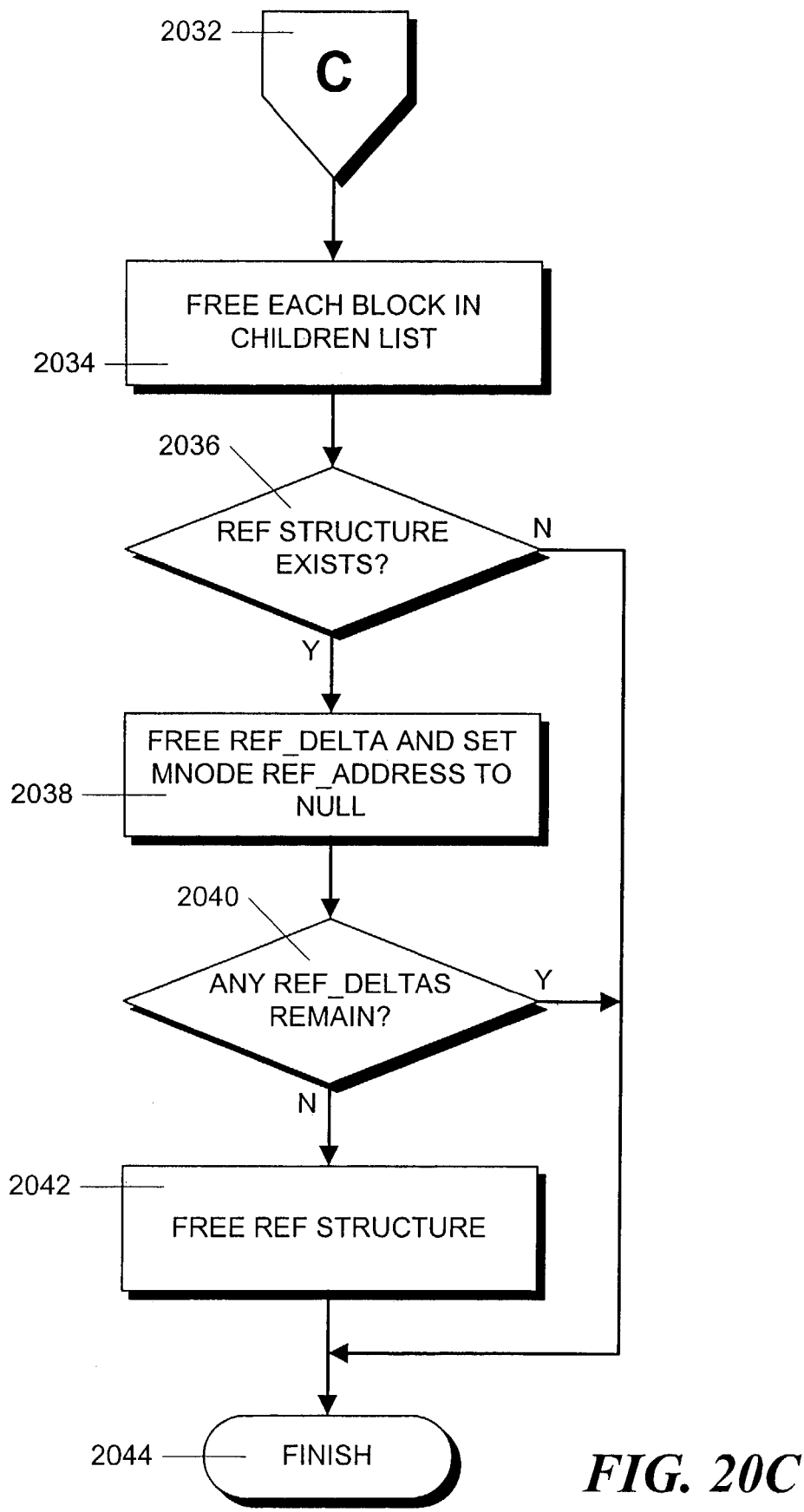

The delete leaf delta MNODE sub-procedure is illustrated in FIGS. 20A–20C. The process begins in step 2000 and proceeds to step 2002 where the MNODE structure is accessed using an address that is provided as an input. If the delete leaf delta MNODE sub-procedure is called from the process for deleting a leaf delta as shown in FIG. 19, this address is the value of the root_address field of the DTREE_DELTA$_{DELETE}$ structure. Then, in step 2004, a list of VMT children of the is MNODE (CHILDREN list) is built by copying the list of child IDs in the MNODE structure. Next, in step 2006, the address of the REF structure is obtained from the ref_address field of the MNODE structure.

In step 2008, a determination is made whether the address of the REF structure is null. In the address is null, then the process proceeds, via off-page connectors 2014 and 2018 to step 2024 that is described below. Alternatively, if, in step 2008 it is determined that the REF structure address is not null, then, in step 2010, the REF structure is accessed. The process then proceeds, via off-page connectors 2012 and 2016, to step 2020 where the REF_DELTA of the MNODE is obtained using value of the ref_id field in the MNODE structure.

Then, in step 2022, all the addresses from the CHILDREN list that are not listed as owned in REF_DELTA are removed. In step 2024, null addresses are removed from the CHILDREN list. Next, a determination is made in step 2026 whether the MNODE is at level zero by examining the value of its level field. If the MNODE level is not zero, then the process proceeds to step 2028 where the entire procedure consisting of steps 2000 to 2044 is performed using each address in the CHILDREN list as an input. Alternatively, if it is determined in step 2026 that the MNODE is at level zero, then step 2028 is skipped.

The process then proceeds, via off-page connectors 2030 and 2032, to step 2034 where each block in the CHILDREN list is freed. Next, in step 2036, a determination is made whether the REF structure exists. If the REF structure does not exist, then processing of the MNODE is complete and the process finishes in step 2044. Alternatively, if the REF structure does exist, then, in step 2038, the REF_DELTA is freed and the ref_address field of the MNODE is set to null.

Next, in step 2040, a determination is made whether REF structure contains any more REF_DELTAs. If the REF structure contains zero deltas, then in step 2042, the REF structure is freed and the process ends in step 2044.

An illustrative delete non-leaf delta sub-procedure is illustrated in FIG. 21. This process begins in step 2100 and proceeds to step 2102 where the DT-child delta (DTREE_DELTA$_{DT\text{-}CHILD}$)of the DTREE_DELTA$_{DELETE}$ structure is determined. In step 2104, the promote non-leaf delta sub-procedure illustrated in FIGS. 22A–22C is performed on the VMT root MNODE of the delta being deleted, as defined by the value of the root_address field in DTREE_DELTA$_{DELETE}$.

Figure 23A:
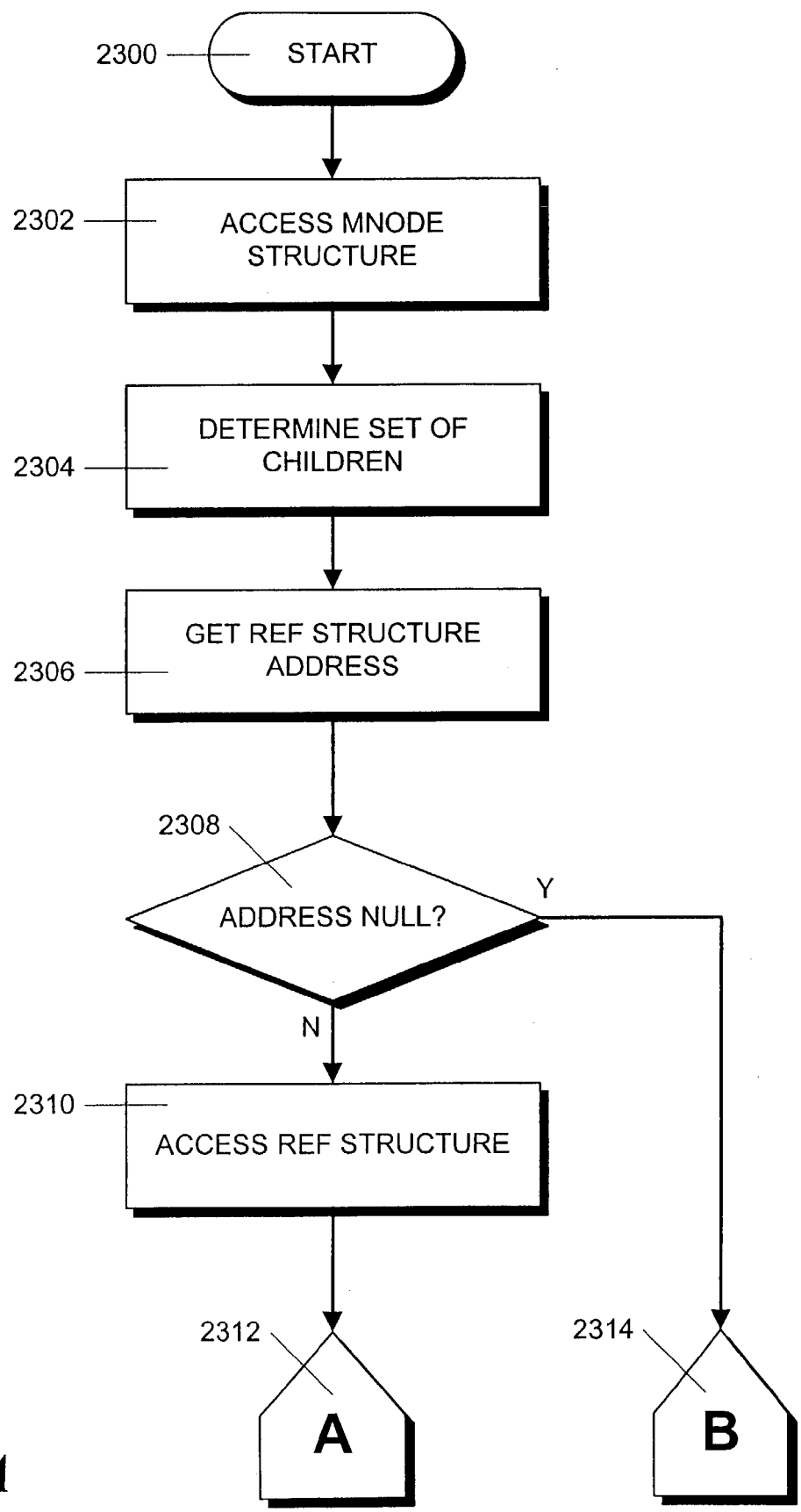
FIGS. 23A and 23B, when placed together, form a flowchart showing the steps in an illustrative sub-procedure for re-labeling an MNODE and all VMT children owned by the MNODE. This sub-procedure is used in the delete non-leaf delta sub-procedure.
Figure 23B:
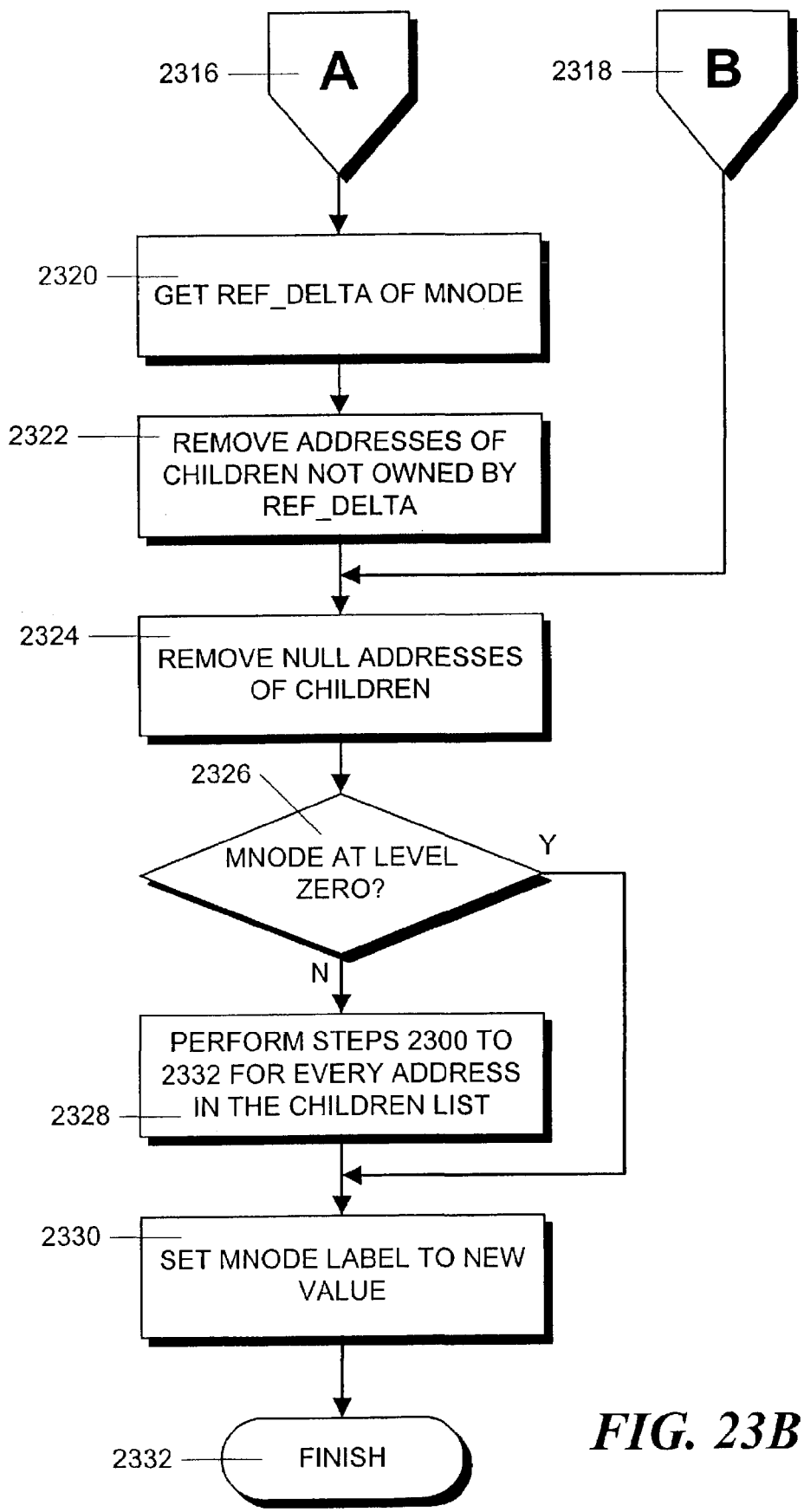

In step 2106, the relabel delta sub-procedure illustrated in FIGS. 23A–23C is performed on the VMT-root MNODE of the DT-child delta, as defined by the value of the root_address field of the child delta (DTREE_DELTA$_{DT\text{-}CHILD}$) with the new label value in the label field of DTREE_DELTA$_{DELETE}$. Next, in step 2108, the VMT root MNODE is freed, then, in step 2110, the DTREE_DELTA$_{DELETE}$ structure is freed and the process finishes in step 2112.

Figure 22A:
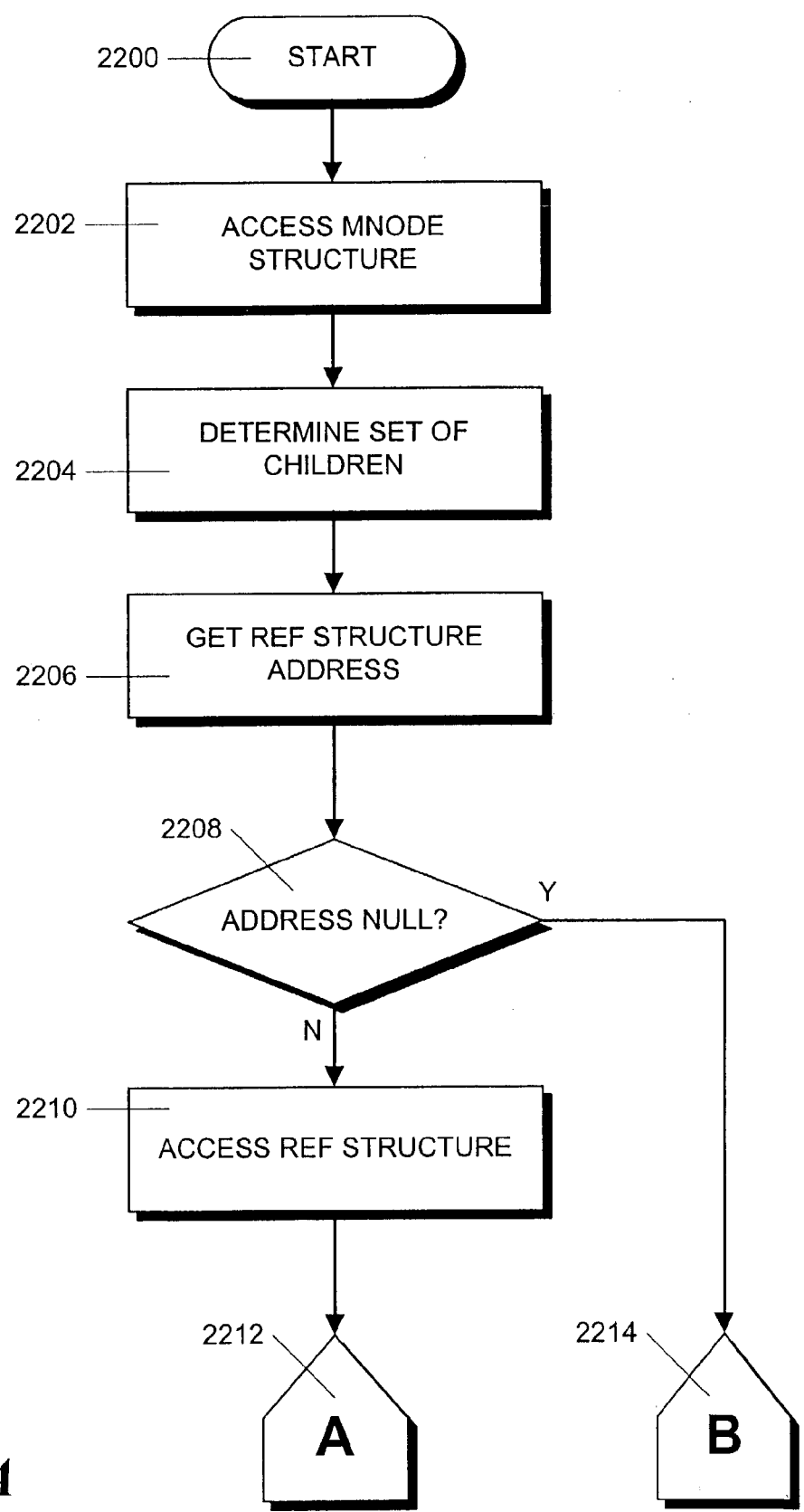
FIGS. 22A, 22B and 22C, when placed together, form a flowchart showing the steps in an illustrative sub-procedure for promoting or deleting a non-leaf deltas that are VMT children owned by an MNODE structure. This sub-procedure is used in the delete non-leaf delta sub-procedure.
Figure 22B:
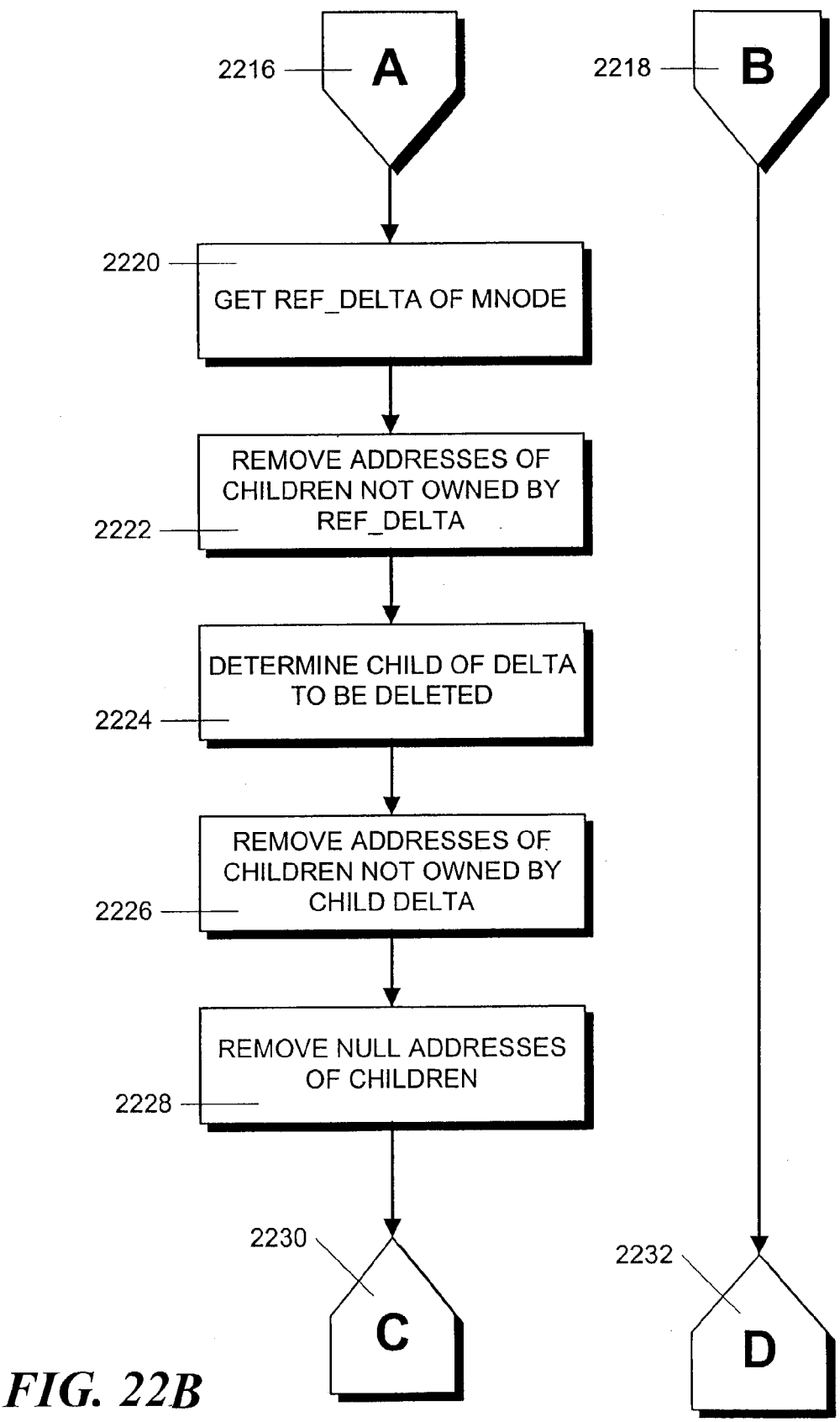
Figure 22C:
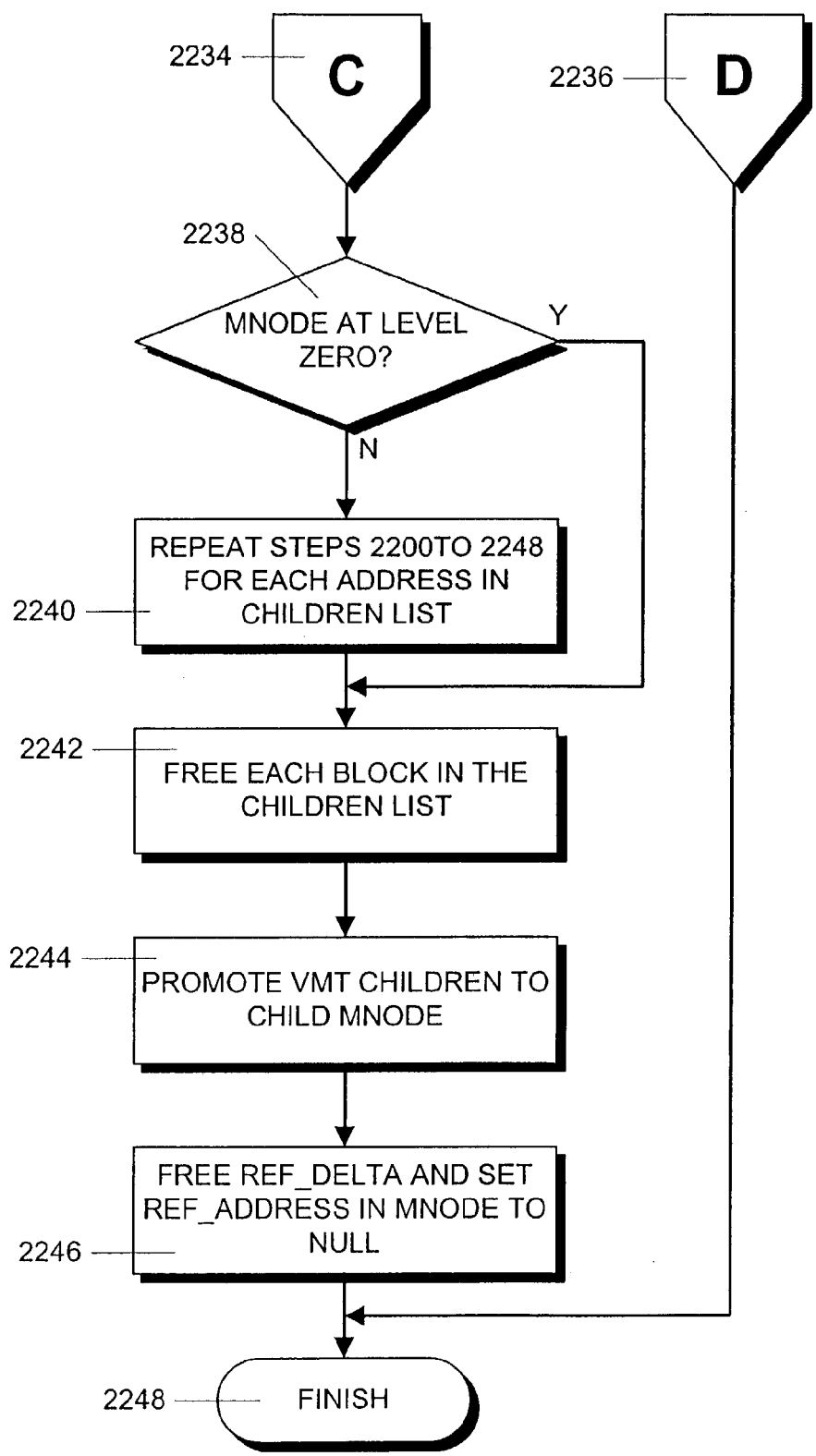

FIGS. 22A–22C, when placed together, show an illustrative sub-procedure for promoting a non-leaf delta sub-procedure. This procedure promotes or deletes VMT children owned by an MNODE as part of the deletion of a non-leaf delta. The input to this procedure is an address. When the procedure is called from the delete non-leaf delta sub-procedure, this address is the address of the VMT root MNODE of the delta being deleted. The process begins in step 2200 and proceeds to step 2202 where the MNODE is accessed using the address provided as an input. Then, in step 2204, a list of VMT children of the MNODE (CHILDREN list) is built by copying the list of child IDs in the MNODE. Next, in step 2206, the address of the REF structure corresponding to the MNODE is retrieved from the value of the ref_address field of the MNODE.

In step 2208, a determination is made whether the REF structure address is null. If so, the process proceeds, via off-page connectors 2214,2218 and 2232, 2236 to finish in step 2246. Alternatively, if, in step 2208, it is determined that the REF structure exists, then in step 2210, the REF structure is accessed and the process proceeds, via off-page connectors 2212 and 2214, to step 2220 where the REF_DELTA of the MNODE (REF_DELTA$_{MNODE}$) is obtained, using the value of the ref_id field in the MNODE structure to access the REF list. Once the REF_DELTA$_{MNODE}$ is obtained, in step 2222, all addresses from the CHILDREN list that are not listed as owned in REF_DELTA$_{MNODE}$ are removed.

In step 2224, the LDT child (REF_DELTA$_{LDT\text{-}CHILD}$) of the MNODE REF_DELTA (REF_DELTA$_{MNODE}$) is determined. Then, in step 2226, all addresses from the CHILDREN list that are not listed as owned in the REF_DELTA$_{LDT\text{-}CHILD}$ data structure are removed. The null addresses in the CHILDREN list are removed in step 2228. The process then proceeds, via off-page connectors 2230 and 2232, to step 2236 where a determination is made whether the value of the level field in the MNODE structure is zero. If, the level is not equal to zero then the process to step 2240 where the entire process consisting of steps 2200 to 2248 is performed using every address in the CHILDREN list as an input. The process then proceeds to step 2242. Alternatively, if, in step 2238, it is determined that the level of the MNODE is not zero, then the process proceeds directly to step 2242.

In step 2242, each block in the CHILDREN list is freed. Next, in step 2244, the process promotes to an LDT-child, the VMT children that are owned by the MNODE structure but shared by its LDT child MNODE. In particular, the value of the owned field in REF_DELTA$_{LDT\text{-}CHILD}$ is set to the value of the owned field in REF_DELTA$_{MNODE}$ ORed with the value of the owned field in REF_DELTA$_{LDT\text{-}CHILD}$. Finally, in step 2246, REF_DELTA$_{MNODE}$ is freed and the value of the ref_address field in the MNODE structure is set to null. The process then finishes in step 2248.

FIGS. 23A and 23B, when placed together, show an illustrative sub-process for re-labeling a delta. This procedure re-labels a MNODE and all VMT-children, owned by the MNODE and is called by the delete non-leaf delta procedure illustrated in FIG. 21. The inputs to this procedure are the address of an MNODE, and the value of a new label, NEW_LABEL. When the process is called from the delete non-leaf delta procedure, the MNODE is VMT-root MNODE of the DT-child delta and the new label is the value in the label field of the delta to be deleted. The process begins in step 2300 and proceeds to step 2302 where the MNODE is accessed using the address provided as an input. Next, in step 2304, a list of VMT children of the MNODE (CHILDREN list) is built by copying the list of child IDs in the MNODE structure.

Then, in step 2306, the address of the REF structure for the MNODE is obtained from the value of the MNODE field ref_address. In step 2308, a determination is made whether the REF structure address is null. If so, the process proceeds, via off-page connectors 2314 and 2318 to step 2334 that is described below. Alternatively, if it is determined in step 2308 that the REF structure address is not null, then the process proceeds to step 2310 where the REF structure is accessed and the process proceeds, via off-page connectors 2312 and 2316 to step 2320. Step 2320 determines the REF_DELTA of the MNODE in step 2312 by using the value of the ref_id field in the MNODE to access the REF data structure.

In step 2322 all addresses from the CHILDREN list that are not listed as owned in REF_DELTA are removed, then, in step 2324, the null addresses are removed from the CHILDREN list. A determination is made in step 2326 whether the MNODE level is equal to zero by examining the level field of the MNODE. If the level is not equal to zero then the entire procedure consisting of steps 2300 to 2332 is performed using every address in the CHILDREN list as an input and then the process proceeds to step 2330. Alternatively, if in step 2326, it is determined that the MNODE level is not zero, then the process proceeds directly to step 2330. In step 2330 the value of the label in the MNODE structure is set to the NEW_LABEL value provided as an input. The process then finishes in step 2332

Figure 24A:
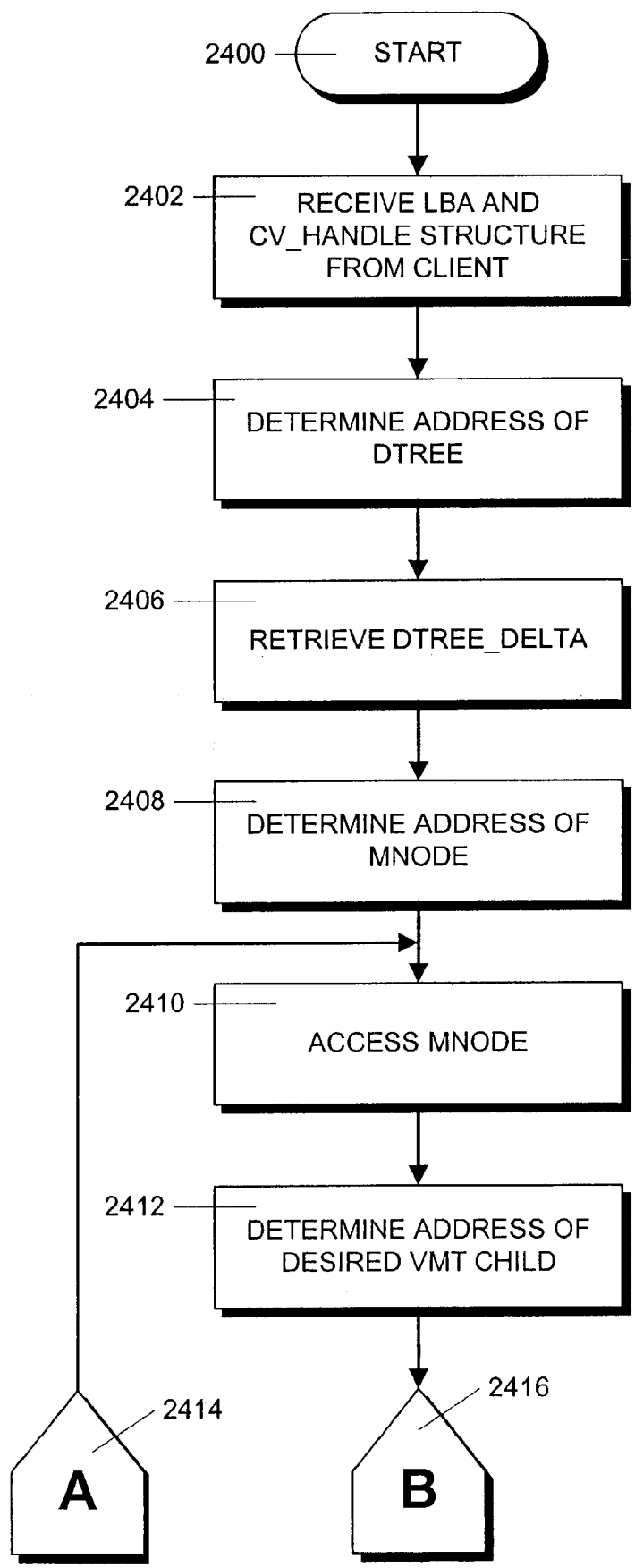
FIGS. 24A and 24B, when placed together, form a flowchart showing the steps in an illustrative sub-procedure for finding the address of data at a given LBA in a covolume.
Figure 24B:
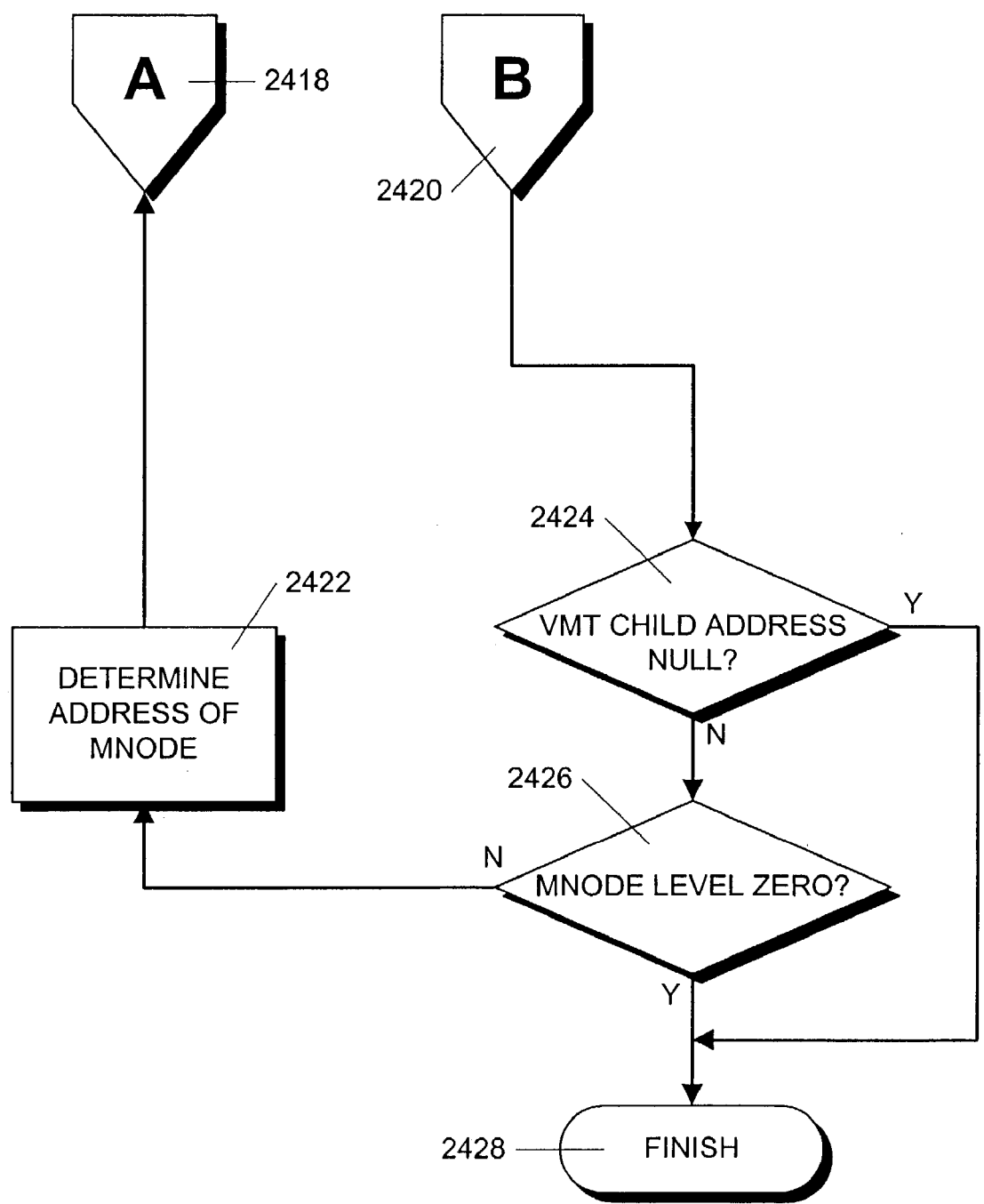

The fifth illustrative procedure, illustrated in FIGS. 24A and 24B (when placed together), finds the address of data at a given LBA in a covolume. The client provides the LBA of the desired data (LBA), and the covolume handle (CV_HANDLE). The address of the desired data (or the null address if the covolume has a hole at the requested LBA) is then returned to the client as described below.

The process begins in step 2400 and proceeds to step 2402 where the address of the DTREE is determined from the value of the CV_HANDLE data structure field dtree_address. Then, in step 2404, the DTREE is accessed and the DTREE_DELTA of the covolume is retrieved using the value of the cv_id field in the CV_HANDLE data structure to access the DTREE in step 2406. In step 2408, the address of the VMT root MNODE of the retrieved DTREE_DELTA is determined from the value of the root_address field of the DTREE_DELTA.

Then, in step 2410, the MNODE data structure is accessed and the address of the desired VMT child is determined in step 2412. This address is determined by a formula that uses the level of the node and the branching factor (number of children per node) to determine which of the child Ds to select. In particular, the list of child IDs in each MNODE is ordered by increasing LBA. Therefore, the first child ID in the list of child IDs in an MNODE maps the lowest (base) LBA to a physical address. If the desired LBA is not the base LBA the desired child address is given by the following formula:

child index=integer((desired-*LBA*−base-*LBA*)/(node branching factor ^ level))

where integer( ) means to drop the fractional part and "^" indicates exponentiation.

After determining the desired child address, the process proceeds, via off-page connectors 2416 and 2420 to step 2424 where a determination is made whether the VMT child address is null. If so, the process finishes in step 2428 and the null address is returned to the client.

Alternatively, if in step 2424, it is determined that the VMT child address is not null, then the process proceeds to step 2426 where the level of the MNODE structure corresponding to the VMT child is checked by examining the value of the level field. If the MNODE level is zero, then the procedure completes in step 2428 and the VMT child address is returned to the client. Alternatively, if the MNODE level of the VMT child is not zero, as determined in step 2426, then the process proceeds to step 2422 where the address of the MNODE is obtained. Then, the process proceeds, via off-page connectors 2418 and 2414, back to step 2410 where the MNODE is accessed. The process then continues as described above until a null address for a VMT child is encountered or level zero is reached.

Figure 25:
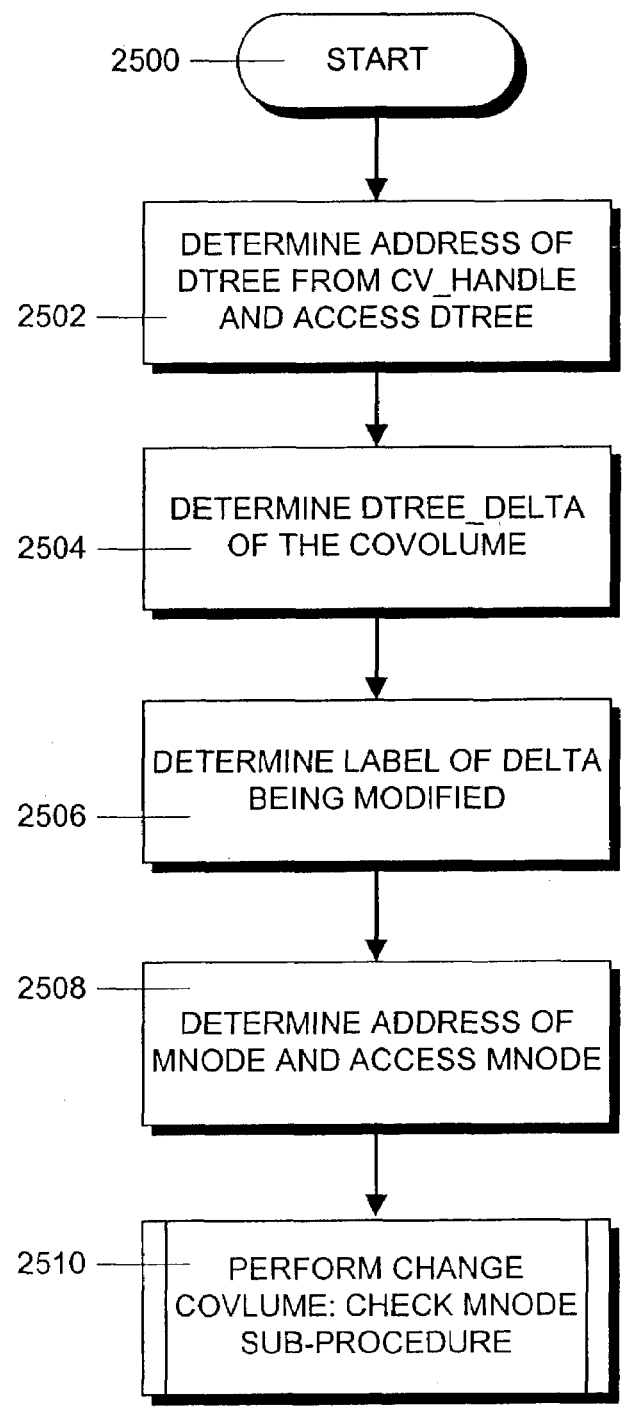
FIG. 25 is a flowchart showing the steps in an illustrative procedure for changing the data at a given LBA in a covolume.

The sixth illustrative procedure shown in FIG. 25 changes the data at a given LBA in a covolume. The client provides the physical address of the new user data (DATA_ADDRESS), the LBA of the new user data (LBA), and the covolume handle (CV_HANDLE). This process starts in step 2500 and proceeds to step 2502 where the address of the DTREE is determined from the value of the dtree_address field of the CV_HANDLE received from the client and then the DTREE is accessed. The DTREE_DELTA of the covolume is subsequently retrieved using the value of the cv_id field to access the DTREE in step 2504. Then, in step 2506 the label of the delta being modified is determined from the value of the label field of the retrieved DTREE_DELTA. In step 2508, the address of the VMT root MNODE of the DTREE_DELTA is obtained from the value of the root_address field of the DTREE_DELTA and the MNODE is accessed. Finally, the change covolume: check MNODE sub-procedure shown in FIG. 26 and described below is performed.

Figure 26:
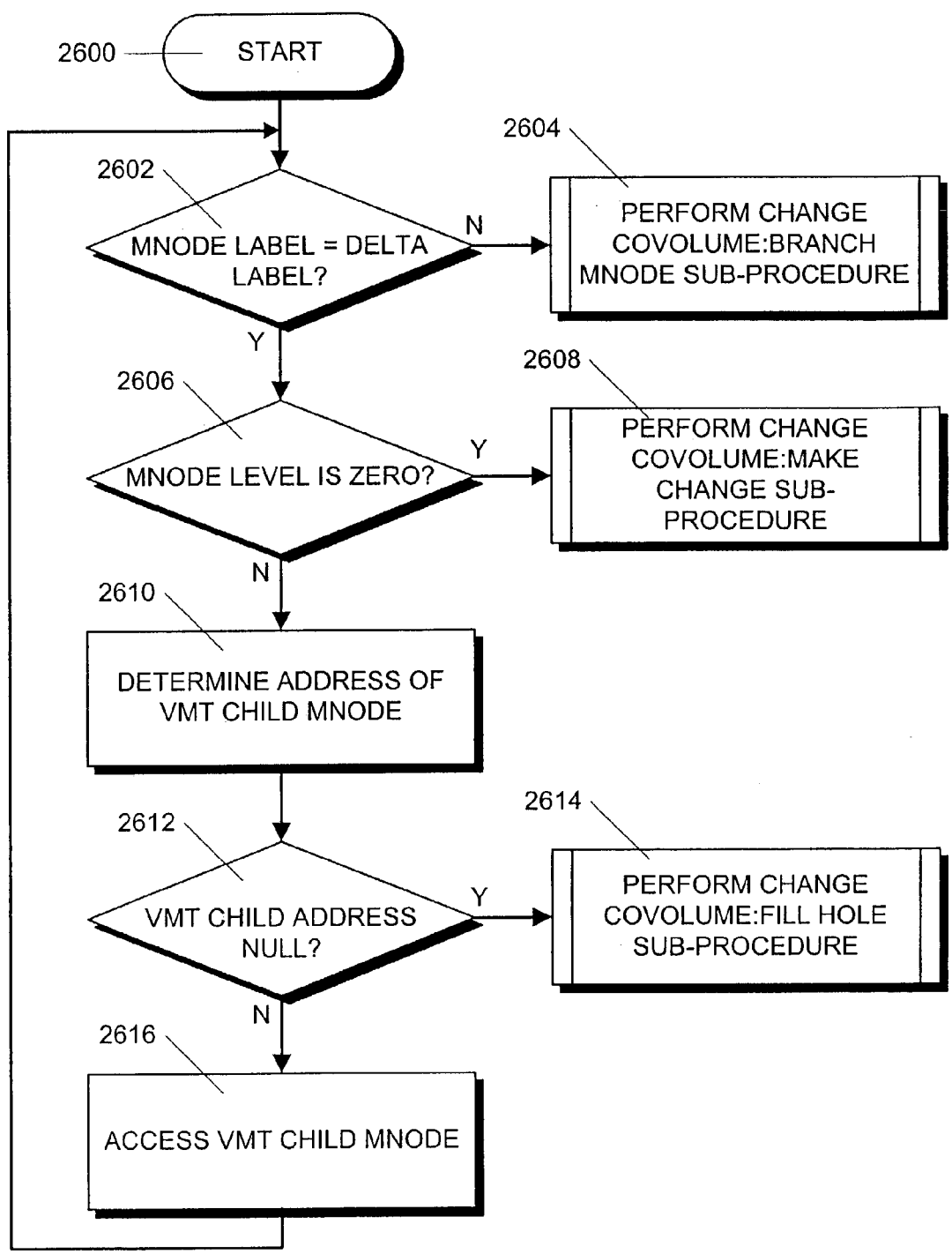
FIG. 26 is a flowchart showing the steps in an illustrative sub-procedure for checking an MNODE used in the change covolume procedure.
Figure 27:
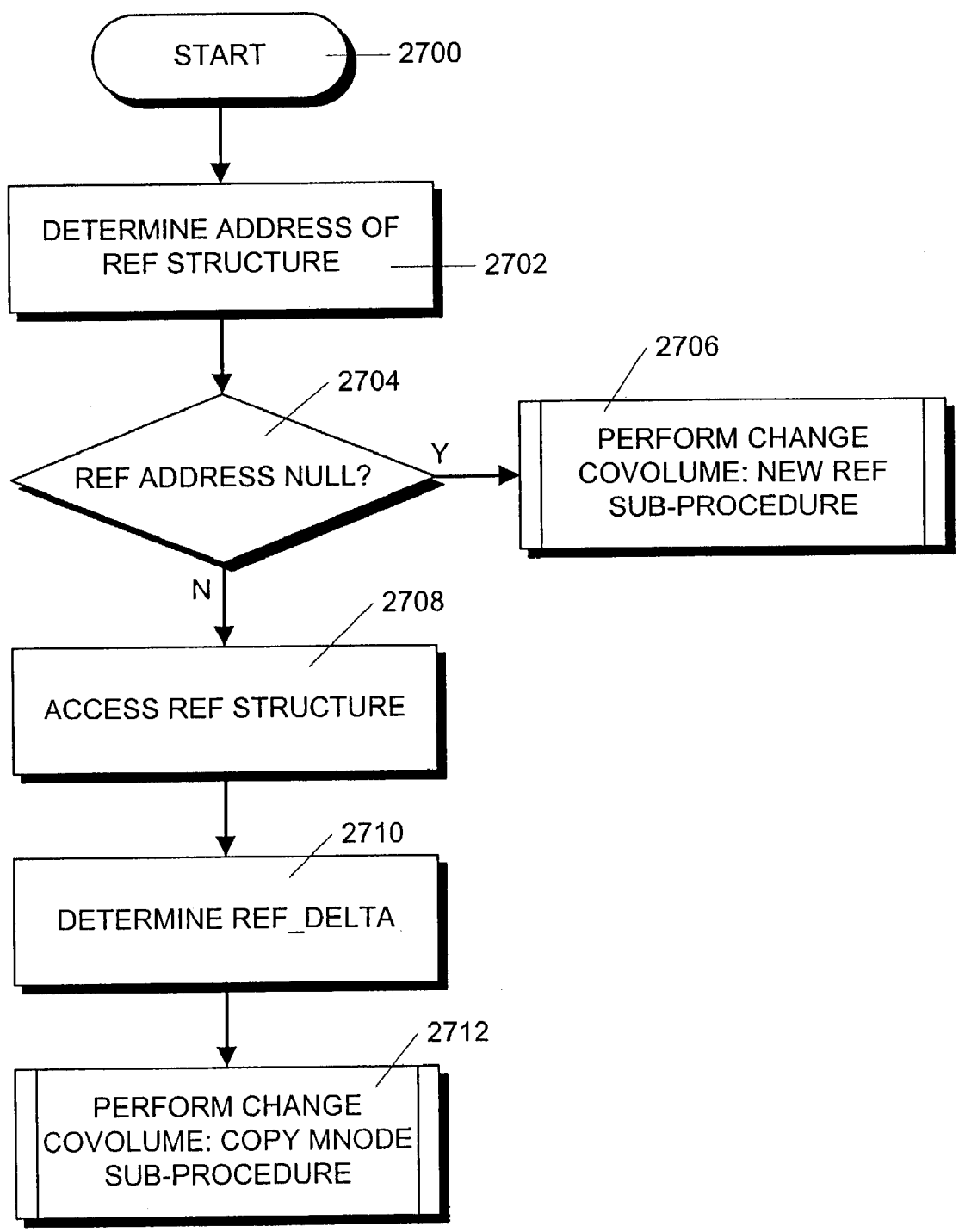
FIG. 27 is a flowchart showing the steps in an illustrative sub-procedure for branching an MNODE, which procedure is used in the change covolume procedure.

An illustrative change covolume: check MNODE sub-procedure is shown in FIG. 26. This process begins in step 2600 and proceeds to step 2602 where the label field of the MNODE is examined to determine whether the value of the MNODE label field is equal to the value of the delta label determined in step 2506. If the label values are not equal to then the change covolume: branch MNODE sub-procedure described below and shown in FIG. 27 is performed in step 2604.

Alternatively, if it is determined in step 2602 that the value of the MNODE label field is equal to the value of the delta label then, in step 2606, a determination is made whether the MNODE level is zero by examining the value of its label field. If the MNODE level is zero, then the change covolume: make the change sub-procedure described below and shown in FIG. 31 is performed in step 2608.

Figure 30:
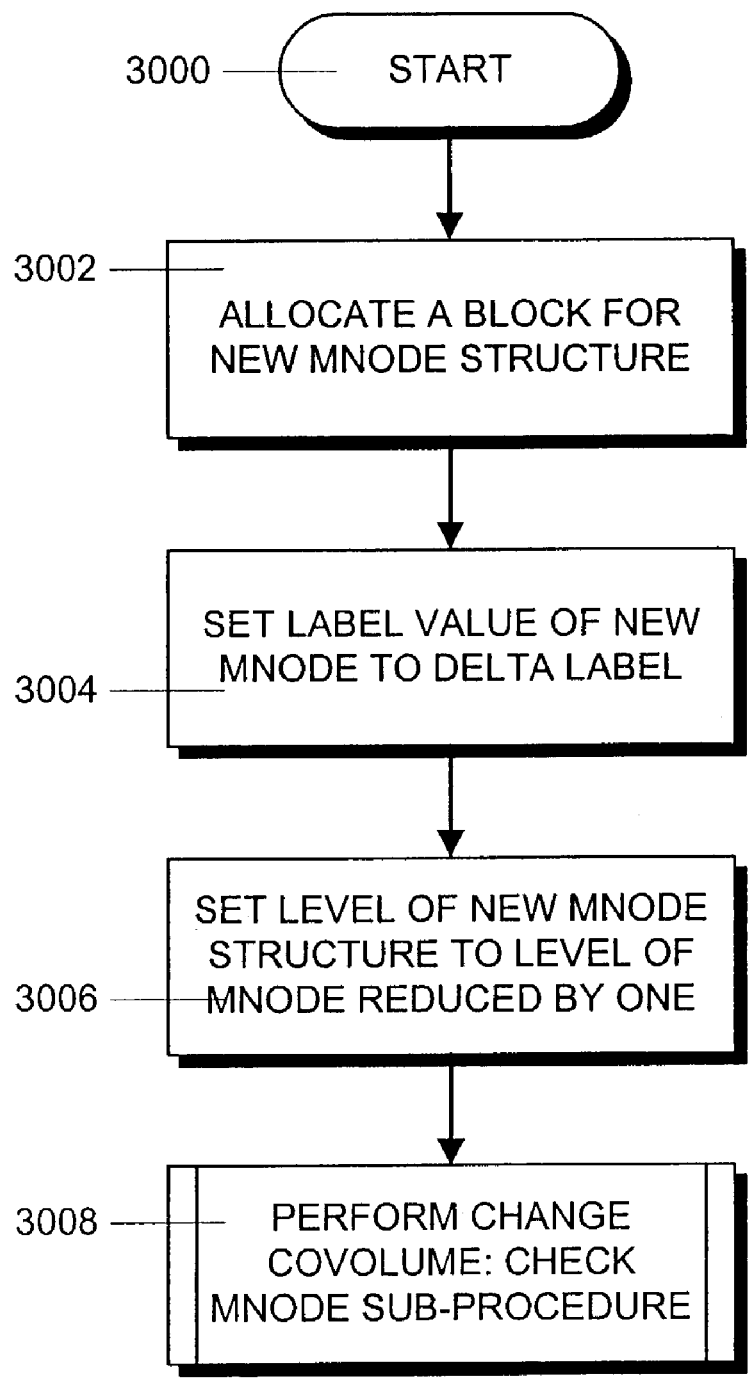
FIG. 30 is a flowchart showing the steps in an illustrative sub-procedure for filling a hole used in the change covolume procedure.

Alternatively, if, in step 2606, it is determined that the MNODE level is not zero, then, in step 2610, the address of the desired VMT child MNODE (MNODE$_{VMT\text{-}CHILD}$) is determined. Next, in step 2612, a determination is made whether the VMT child MNODE address is null. If so, the change covolume: fill hole sub-procedure described below and illustrated in FIG. 30 is performed in step 2614.

Alternatively, if it is determined in step 2612 that the VMT child MNODE address is not null, then in step 2616, the MNODE$_{VMT\text{-}CHILD}$ is accessed and the process proceeds back to step 2602 where steps 2602–2616 are repeated on the MNODE$_{VMT\text{-}CHILD}$.

FIG. 27 illustrates an illustrative change covolume: branch MNODE sub-procedure. This procedure starts in step 2700 and proceeds to step 2702 where the address of the REF structure corresponding to the MNODE is determined from the value of the ref_address field in the MNODE structure.

Figure 28:
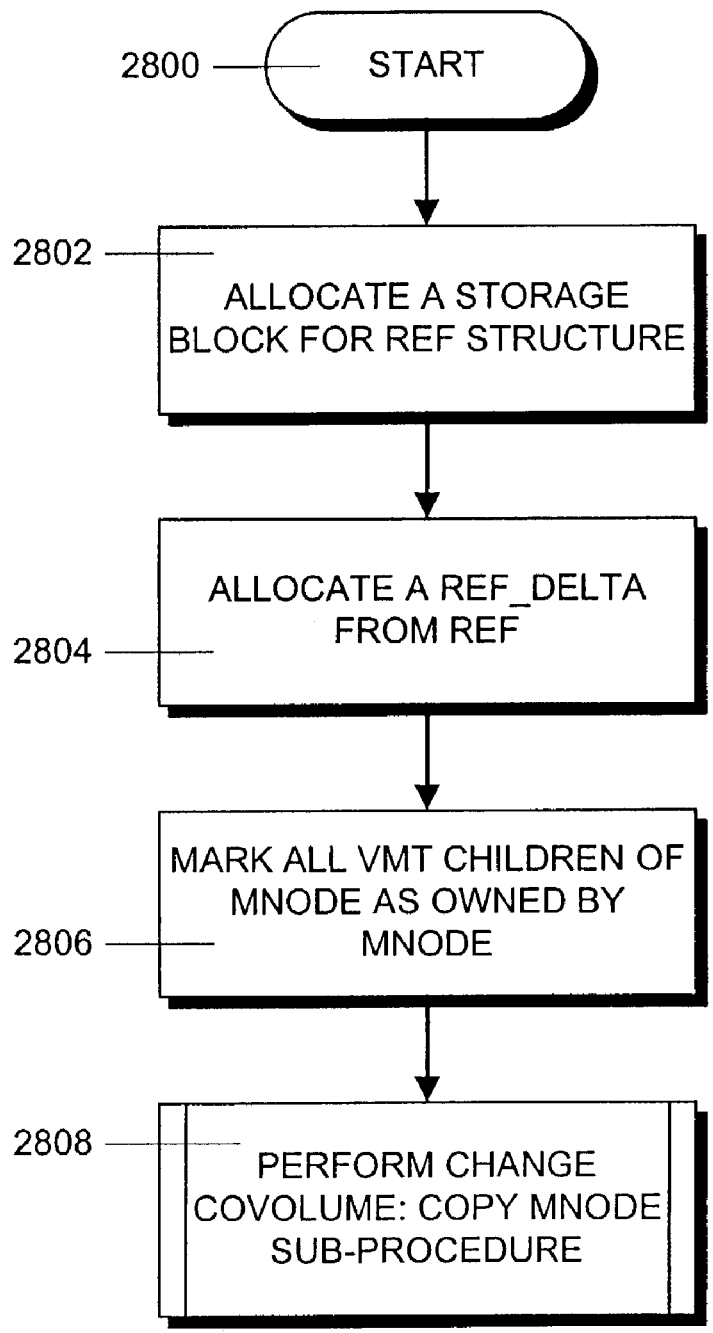
FIG. 28 is a flowchart showing the steps in an illustrative sub-procedure for creating a new ref structure used in the change covolume procedure.

In step 2704, a determination is made whether the REF address is null. If so, then the change covolume: new ref sub-procedure described below and illustrated in FIG. 28 is performed in step 2706. If the REF address is not null as determined in step 2704, then the REF structure is accessed in step 2708 and the REF_DELTA of the MNODE (REF_DELTA$_{LDT\text{-}PARENT}$) is retrieved in step 2710 using the value of the ref_id field of the MNODE. This delta will become the LDT-parent of a new delta. In step 2712, the change covolume: copy MNODE sub-procedure described below and illustrated in FIG. 29 is performed.

An illustrative change covolume: new REF sub-procedure is illustrated in FIG. 28. This sub-process starts in step 2800 and proceeds to step 2802 where the storage system is instructed to allocate a storage block for the new REF structure. then, in step 2804, a REF_DELTA (REF_DELTA$_{LDT\text{-}PARENT}$) is allocated from the REF structure and the value of the ref_id field of the MNODE structure is set to the value of the ref_id field of the REF_DELTA$_{LDT\text{-}PARENT}$ delta. The REF_DELTA$_{LDT\text{-}PARENT}$ is the root of the LDT. Then, in step 2808 all VMT children of the MNODE are marked as owned by MNODE in the REF_DELTA$_{LDT\text{-}PARENT}$ delta. Finally, the change covolume: copy MNODE sub-procedure described below and illustrated in FIG. 29 is performed in step 2808.

Figure 29:
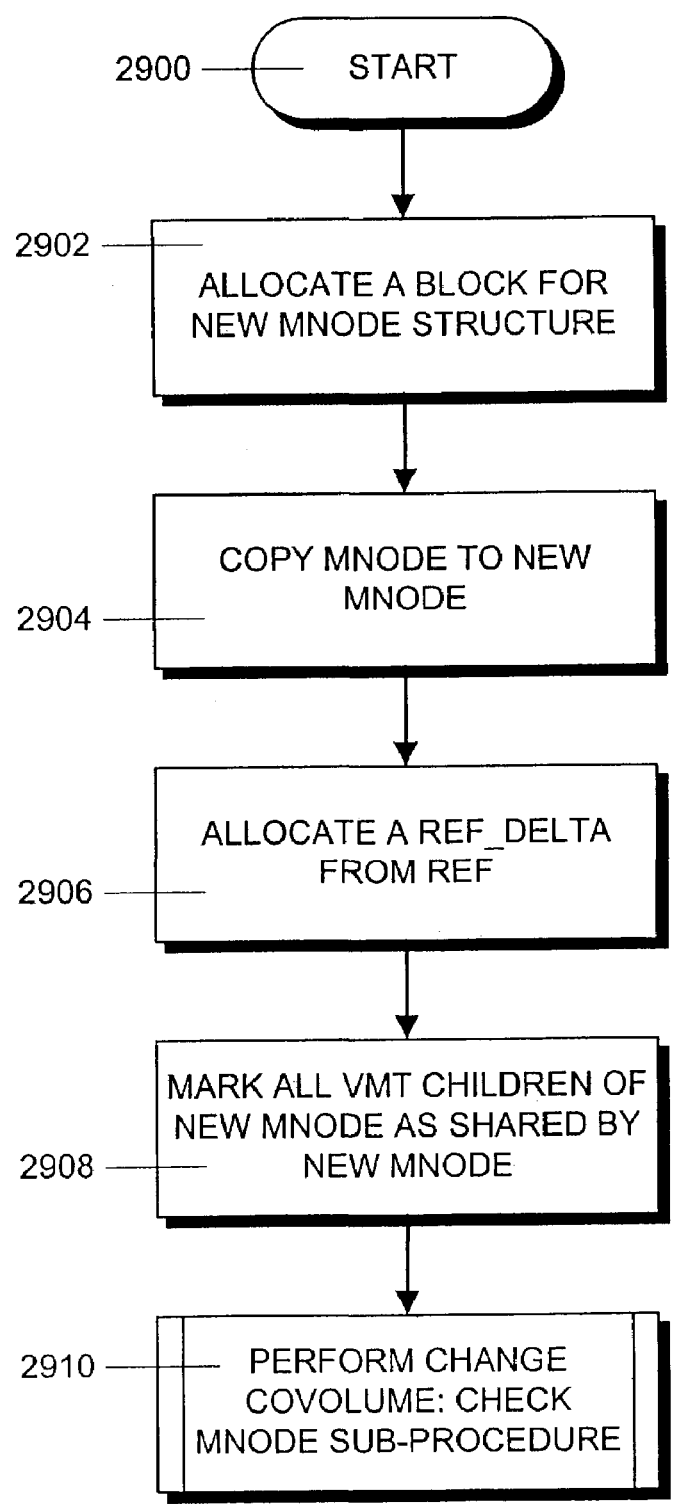
FIG. 29 is a flowchart showing the steps in an illustrative sub-procedure for copying an MNODE used in the change covolume procedure.

An illustrative change covolume: copy MNODE sub-procedure is shown in FIG. 29, which procedure starts in step 2900 and proceeds to step 2902 where the storage system is instructed to allocate a storage block for a new MNODE structure, MNODE$_{LDT\text{-}CHILD}$, to be a LDT child of the current MNODE. In step 2904, the MNODE structure is copied to the new MNODE structure, MNODE$_{LDT\text{-}CHILD}$ and the value of the label field of the MNODE$_{LDT\text{-}CHILD}$ MNODE structure is set to the DELTA_LABEL value.

Then, in step 2906, a new REF_DELTA (REF_DELTA$_{LDT\text{-}CHILD}$) is allocated from the REF structure. This new REF_DELTA has an LDT parent REF_DELTA$_{LDT\text{-}PARENT}$. The value of the ref_id field of MNODE$_{LDT\text{-}CHILD}$ is set to the value of the ref_id field of REF_DELTA$_{LDT\text{-}CHILD}$. In step 2908, all VMT children of MNODE$_{LDT\text{-}CHILD}$ are marked as shared by MNODE$_{LDT\text{-}CHILD}$ in the REF_DELTA$_{LDT\text{-}CHILD}$ structure. Finally, the change covolume: check MNODE sub-procedure described above and illustrated in FIG. 26 is performed in step 2910.

An illustrative change covolume: fill hole sub-procedure is shown in FIG. 30. This sub-procedure starts in step 3000 and proceeds to step 3002 where the storage system allocates a block for a new MNODE, MNODE$_{VMT\text{-}CHILD}$, to be a VMT child of the current MNODE. In step 3004, the value of the label field of the MNODE$_{VMT\text{-}CHILD}$ structure is set to the value of DELTA_LABEL. Then, in step 3006, the value of 25 the level field of the MNODE$_{VMT\text{-}CHILD}$ structure is set to the value of the level field of the MNODE structure reduced by one. Next, the change covolume: check MNODE sub-procedure described above and illustrated in FIG. 26 is performed on MNODE$_{VMT\text{-}CHILD}$ in step 3008.

Figure 31A:
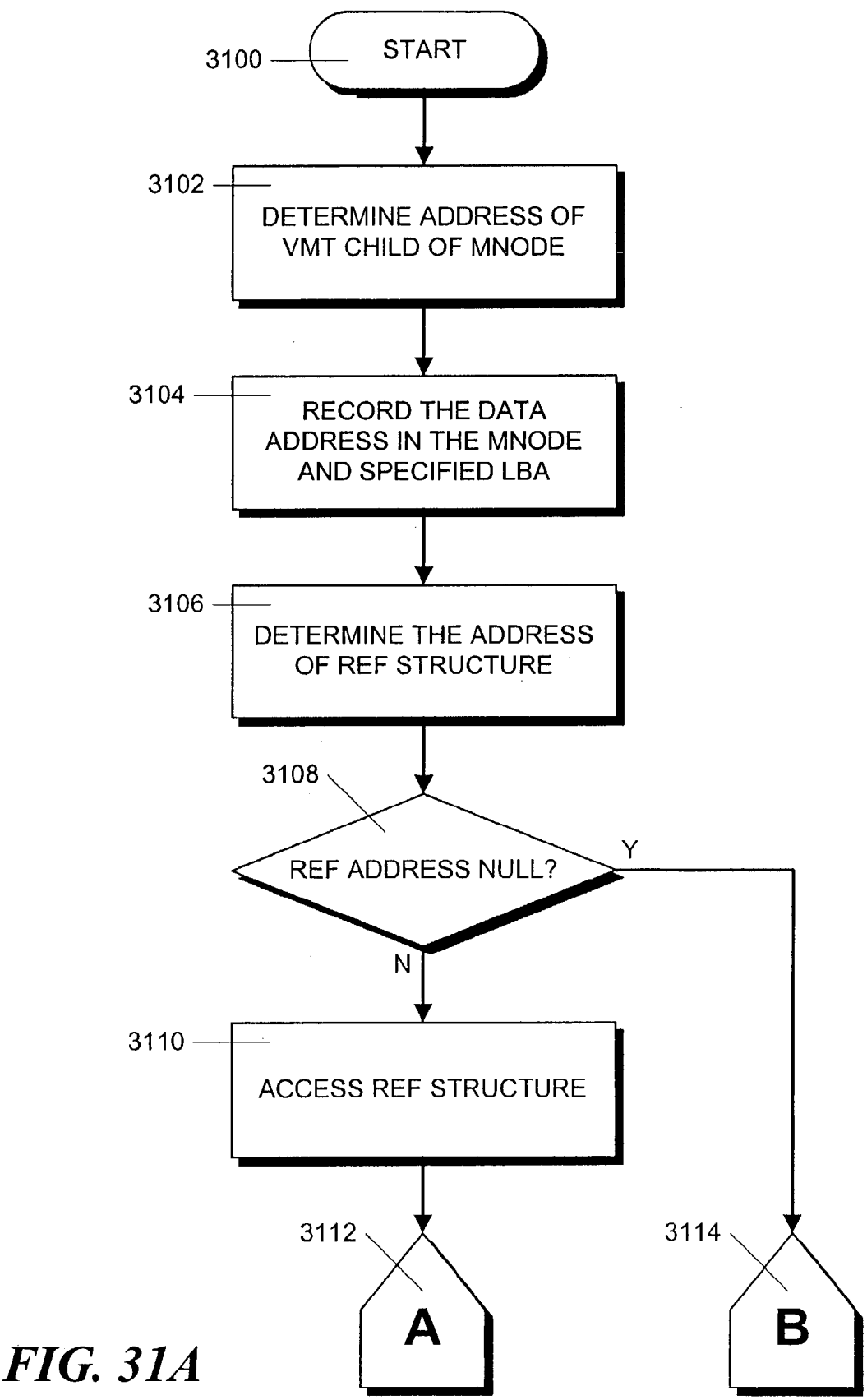
FIGS. 31A and 31B, when placed together, form a flowchart showing the steps in an illustrative sub-procedure for making a change in a covolume used in the change covolume procedure.
Figure 31B:
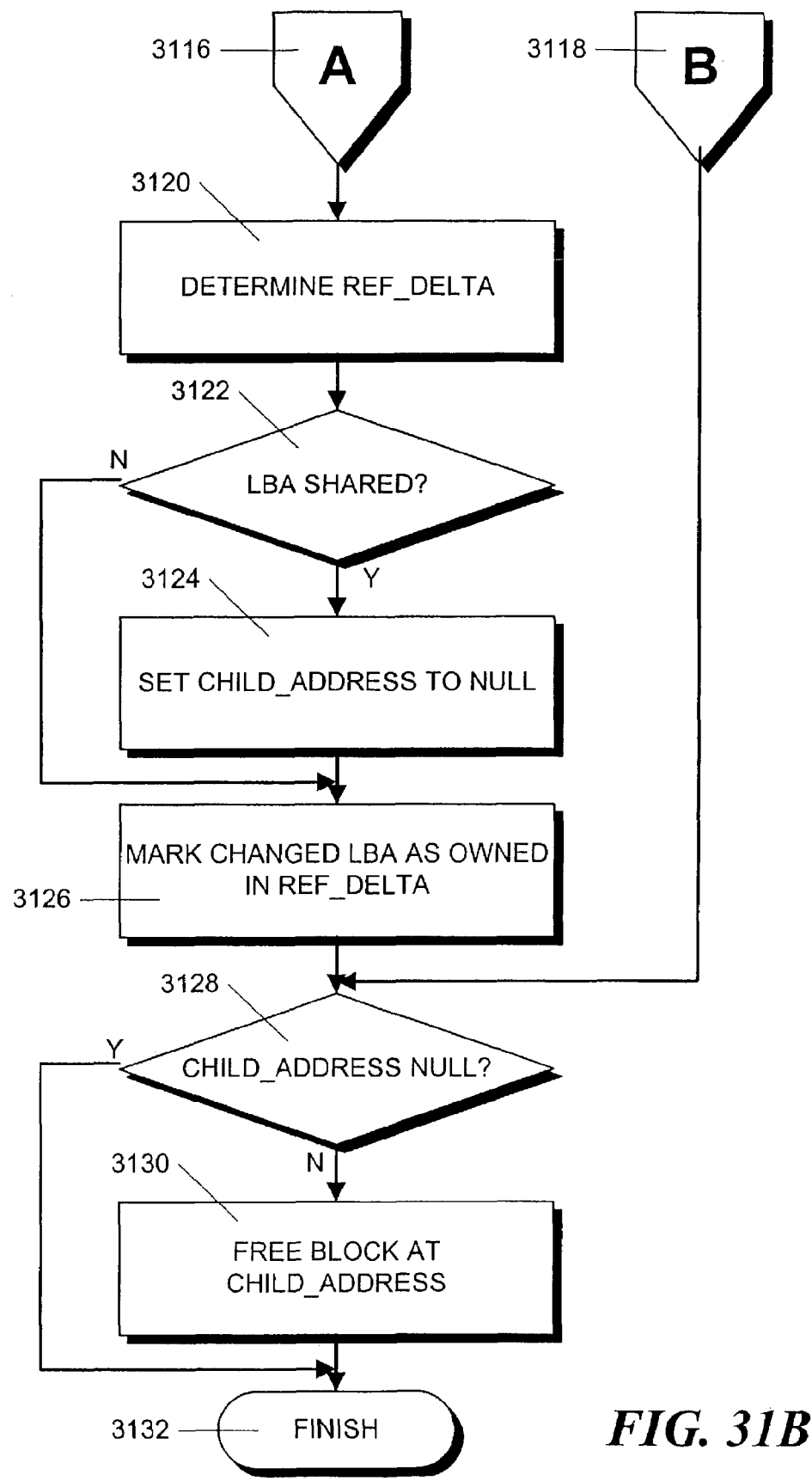

A change covolume: make the change sub-procedure suitable for use with the inventive copy process is shown in FIGS. 31A and 31B (when placed together.) This process begins in step 3100 and proceeds to step 3102 where the address (CHILD_ADDRESS) of the VMT child of the MNODE that is at the LBA to be changed is determined. In step 3104, the DATA_ADDRESS is recorded in the MNODE and the specified LBA. Then, in step 3106, the address of the MNODE REF structure is determined from the value of the ref_address field in the MNODE structure. A determination is made in step 3108 whether the address of the REF structure is null. If the address of the REF structure is null, then the process proceeds, via off-page connectors 3114 and 3118 to step 3128, which is described below.

Alternatively, if the REF structure address is not null, as determined in step 3108, then, in step 3110, the REF structure is accessed. The process then proceeds, via off-page connectors 3112 and 3116, to step 3120 where the REF_DELTA of the MNODE structure is determined by using the value of the ref_id field of the MNODE to access the REF structure.

In step 3122, a determination is made whether the LBA is shared or owned by the MNODE, as recorded in the REF_DELTA structure. If the LBA is shared as determined in step 3122, then CHILD_ADDRESS is set to null in step 3124 and the process proceeds to step 3126, otherwise the process proceeds directly to step 3126.

In step 3126, the changed LBA is marked as owned in the REF_DELTA structure. Then, in step 3128, a determination is made whether CHILD_ADDRESS is null. If CHILD_ADDRESS is not null, as determined in step 3128, then the storage block at CHILD_ADDRESS is freed in step 3130 and the process finishes in step 3132. However, if the CHILD_ADDRESS is determined to be null, in step 3128, then the process proceeds directly to finish in step 3132.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although particular sub-processes and routines have been used to illustrate procedures performed by the inventive copy system, that similar procedures and routines could also be used in the same manner as that described. Other aspects, such as the specific instructions utilized to achieve a particular function, as well as other modifications to the inventive concept are intended to be covered by the appended claims.

What is claimed is:

1. A method for efficiently copying a distributed data file consisting of a source covolume having a plurality of data blocks, each data block being located at a physical block address in a storage system, the method comprising:
   (a) creating a hierarchical volume map tree having a root node corresponding to the source covolume, a plurality of intermediate nodes and a plurality of leaf nodes, each leaf node corresponding to one of the plurality of data blocks, the volume map tree mapping logical block addresses to physical block addresses;
   (b) adding a path to the tree when a write operation in the source covolume writes data with a logical block address to a physical block address;
   (c) creating a new covolume that is a copy of the source covolume by copying the root node of the volume map tree to the new covolume wherein the new covolume has a different root node, but shares all of the intermediate nodes and the leaf nodes with the source covolume; and
   (d) adding a new path to the tree when a write operation in the new covolume writes data at a logical block address already written by a write operation in the source covolume wherein the new covolume shares all of the intermediate nodes and the leaf nodes with the source covolume except for intermediate nodes and leaf nodes corresponding to data which has been changed.

2. The method of claim 1 wherein the volume map tree root node and the data in the source covolume are collectively called a delta and the method further comprises:
   (e) arranging deltas corresponding to a plurality of covolumes into a delta tree structure indicating from which covolume another covolume was created.

3. The method of claim 2 further comprising:
   (f) walking the delta tree to determine whether a delta corresponding to a particular covolume is shared by two or more deltas corresponding to covolumes that have been copied from the particular covolume; and
   (g) deleting the particular delta when it is not shared and a source covolume that is part of the particular delta is deleted.

4. The method of claim 3 further comprising:
   (h) combining the shared delta with its parent delta when a covolume corresponding to the parent delta is deleted.

5. The method of claim 3 further comprising:
   (i) combining a delta with a single child delta that depends from the delta when a covolume that corresponds to the delta is deleted.

6. The method of claim 2 wherein the delta tree has a root delta and a plurality of natural deltas wherein each natural delta corresponds to a covolume in which the latest changes are made and wherein the method further comprises the steps of walking the delta tree starting at a particular natural delta to search the data in a covolume corresponding to the particular natural delta.

7. The method of claim 2 further comprising:
(j) arranging the deltas into a least one local delta tree structure corresponding to a particular logical block address, which local delta tree structure indicates which deltas modified the logical block address.

8. The method of claim 7 further comprising:
(k) using the local delta tree structure to determine which data blocks are no longer referenced by a covolume; and
(l) freeing the data blocks determined in step (k).

9. The method of claim 1 wherein step (b) comprises marking each intermediate node and each leaf node in the path as owned by the source covolume.

10. The method of claim 9 wherein step (d) comprises, during a write operation in the new covolume, mapping a logical block address to a physical block address and adding a new path to the volume map tree when the mapping requires modification of a node owned by the source covolume.

11. Apparatus for efficiently copying a distributed data file consisting of a source covolume having a plurality of data blocks, each data block being located at a physical block address in a storage system, the apparatus comprising:
a hierarchical volume map tree having a root node corresponding to the source covolume, a plurality of intermediate nodes and a plurality of leaf nodes, each leaf node corresponding to one of the plurality of data blocks, the volume map tree mapping logical block addresses to physical block addresses;
a mechanism that adds a path to the tree when a write operation in the source covolume writes data with a logical block address to a physical block address;
a mechanism for creating a new covolume that is a copy of the source covolume by copying the root node of the volume map tree to the new covolume wherein the new covolume has a different root node, but shares all of the intermediate nodes and the leaf nodes with the source covolume; and
a mechanism that adds a new path to the tree when a write operation in the new covolume writes data at a logical block address already written by a write operation in the source covolume wherein the new covolume shares all of the intermediate nodes and the leaf nodes with the source covolume except for intermediate and leaf nodes corresponding to data which has been changed.

12. The apparatus of claim 11 wherein the volume map tree root node and the data in the source covolume are stored in a delta structure and the apparatus further comprises a mechanism that arranges delta structures corresponding to a plurality of covolumes into a delta tree structure indicating from which covolume another covolume was created.

13. The apparatus of claim 12 further comprising a mechanism that walks the delta tree to determine whether a delta corresponding to a particular covolume is shared by two or more deltas corresponding to covolumes that have been copied from the particular covolume and a mechanism that deletes the particular delta when it is not shared and a source covolume that is part of the particular delta is deleted.

14. The apparatus of claim 13 further comprising a mechanism that combines the shared delta with its parent delta when a covolume corresponding to the parent delta is deleted.

15. The apparatus of claim 13 further comprising a mechanism that combines a delta with a single child delta that depends from the delta when a covolume that corresponds to the delta is deleted.

16. The apparatus of claim 12 wherein the delta tree has a root delta and a plurality of natural deltas wherein each natural delta corresponds to a covolume in which the latest changes are made and wherein the apparatus further comprises a mechanism that walks the delta tree starting at a particular natural delta to search the data in a covolume corresponding to the particular natural delta.

17. The apparatus of claim 12 further comprising a mechanism that arranges deltas in a further local delta tree structure corresponding to a particular logical block address, which local delta tree indicates which deltas modified the logical block address.

18. The apparatus of claim 17 further comprising a mechanism that uses the local delta tree structure to determine which data blocks are no longer referenced by a covolume; and a mechanism that frees the data blocks that are no longer referenced by a covolume.

19. The apparatus of claim 11 wherein the mechanism that adds a path to the tree comprises a mechanism that marks each intermediate node and each leaf node in the path as owned by the source covolume.

20. The apparatus of claim 19 wherein the mechanism that adds a new path to the tree comprises a mechanism that is operable during a write operation in the new covolume that maps a logical block address to a physical block address, and adds a new path to the volume map tree when the mapping requires modification of a node owned by the source covolume.

21. A computer program product for efficiently copying a distributed data file consisting of a source covolume having a plurality of data blocks, each data block being located at a physical block address in a storage system, the computer program product comprising a computer usable medium having computer readable program code thereon embedded in memory, including:
program code for creating a hierarchical volume map tree having a root node corresponding to the source covolume, a plurality of intermediate nodes and a plurality of leaf nodes, each leaf node corresponding to one of the plurality of data blocks, the volume map tree mapping logical block addresses to physical block addresses;
program code for adding a path to the tree when a write operation in the source covolume writes data with a logical block address to a physical block address;
program code for creating a new covolume that is a copy of the source covolume by copying the root node of the volume map tree to the new covolume wherein the new covolume has a different root node, but shares all of the intermediate nodes and the leaf nodes with the source covolume; and
program code for adding a new path to the tree when a write operation in the new covolume writes data at a logical block address already written by a write operation in the source covolume wherein the new covolume shares all of the intermediate nodes and the leaf nodes with the source covolume except for intermediate nodes and leaf nodes corresponding to data which has been changed.

22. The computer program product of claim 21 wherein the volume map tree root node and the data in the source covolume are collectively called a delta and the computer program product further comprises program code for arranging deltas corresponding to a plurality of covolumes into a delta tree structure indicating from which covolume another covolume was created.

23. The computer program product of claim 22 further comprising program code for walking the delta tree to determine whether a delta corresponding to a particular covolume is shared by two or more deltas corresponding to covolumes that have been copied from the particular covolume and program code for deleting the particular delta when it is not shared and a source covolume that is part of the particular delta is deleted.

24. The computer program product of claim 23 further comprising program code for combining the shared delta with its parent delta when a covolume corresponding to the parent delta is deleted.

25. The computer program product of claim 23 further comprising program code for combining a delta with a single child delta that depends from the delta when a covolume that corresponds to the delta is deleted.

26. The computer program product of claim 22 wherein the delta tree has a root delta and a plurality of natural deltas wherein each natural delta corresponds to a covolume in which the latest changes are made and wherein the computer program product further comprises program code for walking the delta tree starting at a particular natural delta to search the data in a covolume corresponding to the particular natural delta.

27. The computer program product of claim 22 further comprising program code for arranging the deltas into a least one local delta tree structure corresponding to a particular logical block address, which local delta tree structure indicates which deltas modified the logical block address.

28. The computer program product of claim 27 further comprising program code for using the local delta tree structure to determine which data blocks are no longer referenced by a covolume and program code for freeing the data blocks which are no longer referenced by a covolume.

* * * * *